(12) United States Patent
Masuoka et al.

(10) Patent No.: US 7,269,635 B2
(45) Date of Patent: Sep. 11, 2007

(54) FILE TRANSFER SYSTEM FOR SECURE REMOTE FILE ACCESSES

(75) Inventors: Yoshimasa Masuoka, Fuchu (JP); Nobutoshi Sagawa, Koganei (JP); Itaru Nishizawa, Koganei (JP); Tsuneyuki Imaki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 669 days.

(21) Appl. No.: 10/170,391

(22) Filed: Jun. 14, 2002

(65) Prior Publication Data
US 2003/0061350 A1    Mar. 27, 2003

(30) Foreign Application Priority Data
Sep. 27, 2001   (JP)   ............................. 2001-296050

(51) Int. Cl.
 G06F 15/167   (2006.01)
 G06F 15/16    (2006.01)
(52) U.S. Cl. ..................................... 709/218; 709/203
(58) Field of Classification Search ................ 709/206, 709/207, 228, 229, 248, 203, 218; 379/88.13, 379/93.24; 340/5.8
See application file for complete search history.

(56) References Cited

U.S. PATENT DOCUMENTS

| | | | | |
|---|---|---|---|---|
| 5,668,876 A | | 9/1997 | Falk et al. | |
| 5,844,969 A | * | 12/1998 | Goldman et al. | 379/93.24 |
| 5,956,521 A | * | 9/1999 | Wang | 710/35 |
| 5,974,449 A | * | 10/1999 | Chang et al. | 709/206 |
| 6,138,146 A | * | 10/2000 | Moon et al. | 709/206 |
| 6,256,666 B1 | * | 7/2001 | Singhal | 709/217 |
| 6,745,024 B1 | * | 6/2004 | DeJaco et al. | 709/206 |
| 6,779,022 B1 | * | 8/2004 | Horstmann et al. | 709/206 |
| 2002/0162047 A1 | * | 10/2002 | Peters et al. | 714/5 |
| 2006/0026262 A1 | * | 2/2006 | Abbott et al. | 709/217 |

OTHER PUBLICATIONS

"UNIX Network Programming", Prentice Hall, Richard S. Stevens, pp. 171-196.
RFC 1617, "HTTP Authentication: Basic and Digest Access Authentication", J. Francs et al, Jun. 1999.

* cited by examiner

*Primary Examiner*—Ario Etienne
*Assistant Examiner*—Sargon Nano
(74) *Attorney, Agent, or Firm*—Mattingly, Stanger, Malur & Brundidge, P.C.

(57) ABSTRACT

In a file transfer system, a file stored in a server computer is transmitted to a client computer through a network. A portable mobile apparatus also connectable to the network has a transmission requesting means for requesting the server computer that the user of the mobile apparatus be authenticated and a desired file be transmitted from the server computer to the client computer. The server computer has a communication control unit for transmitting the desired file requested by the mobile apparatus to the client computer after authenticating the user of the mobile apparatus.

2 Claims, 20 Drawing Sheets

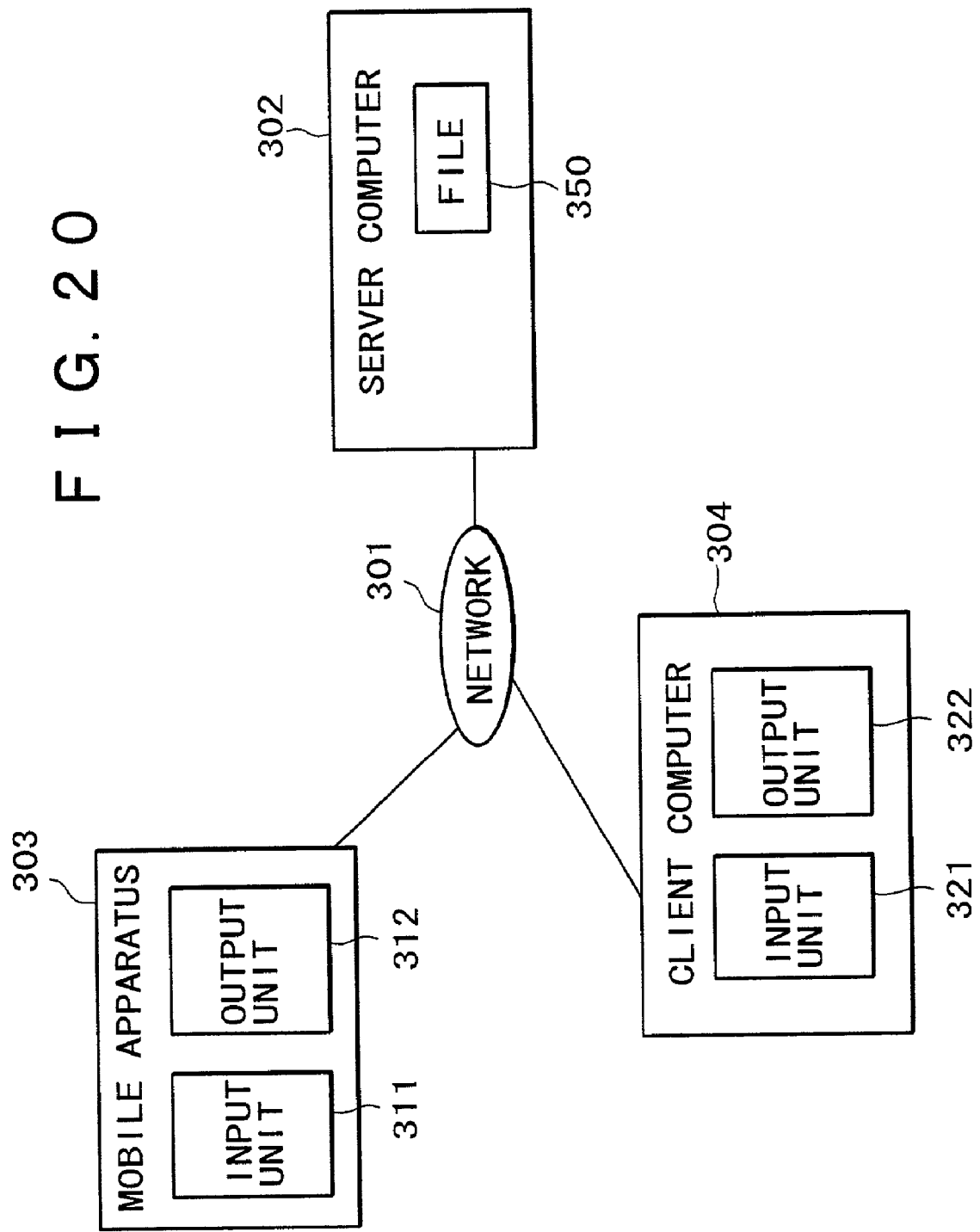

FILE TRANSFER SYSTEM FOR SECURE REMOTE FILE ACCESSES

BACKGROUND OF THE INVENTION

1. Field of the Invention

In general, the present invention relates to a method of transferring a file through a network. More particularly, the present invention relates to a system and a program, which are used for making an access to a file stored in a protected server computer, from any computer connected to the wide area network.

2. Detailed Description of Related Art

Recently, due to the popularity of technologies such as the WWW (World Wide Web), information stored in a server computer can be transferred to any place for use at the place.

In addition, due to the popularity of a wireless/mobile communication means such as a hand phone and the popularity of a mobile apparatus such as a PDA (Personal Data Assistant) as well as the popularity of a small notebook personal computer, it is possible to establish a connection to a server computer of a desired network by being not restricted by the place at which the connection is established.

Because of the capabilities described above, there is a rising demand for a capability of storing a personal file or other information used in a work of the user itself in the server computer and a capability of transferring the personal file or the other information from the server computer to a place desired by the user itself for use at the place. Given such capabilities, however, it is also necessary to prevent an illegal access to the server computer from being made by another unauthorized user or a program for malicious purposes.

With the conventional technology, if it is desired to store a personal file or other information used in a work of the user itself in the server computer and to transfer the personal file or the other information from the server computer to a place desired by the user itself for use at the place, there are 3 methods to prevent an illegal access to the server computer from being made by another malicious user or a program for illegal purposes. Any of the methods are explained by referring to FIG. 20. A file, which the user wants to transfer, is a file 350 shown in FIG. 20.

First, the first method is explained. This method is used by the user for transferring the file 350 from a server computer 302 to a mobile apparatus 303 carried by the user.

Concretely, first, the user operates the mobile apparatus 303 to establish a communication with the server computer 302 through a network 301. The server computer 302 is capable of verifying that the user is a user having a right to use the file 350. The operation carried out by the user on the mobile apparatus 303 is normally called a sign-on or login operation or an operation with another name and generally requires a password.

After the sign-on operation is carried out, the server computer 302 transfers the file 350 to the mobile apparatus 303. When the mobile apparatus 303 receives the transferred file 350, the user is capable of using the file 350 through an input unit 311 and an output unit 312, which are employed in the mobile apparatus 303.

The second method is used by the user to carry out a sign-on operation in order to use a file from a client computer 304 placed at a location close to the present location of the user. More concretely, the client computer 304 is typically a computer installed at a public location. The user operates the client computer 304 to establish a communication with the server computer 302 through the network 301 in order to carry out a sign-on operation.

After the sign-on operation is completed, the server computer 302 transfers the file 350 to the client computer 304. When the client computer 304 receives the transferred file 350, the user is capable of using the file 350 through the input unit 321 and the output unit 322.

The third method is used by the user for transferring the file 350 to a mobile apparatus 303 carried by the user and then further transferring the file 350 from the mobile apparatus 303 to a client computer 304 placed at a location close to the present location of the user.

More concretely, the user operates the mobile apparatus 303 to establish a communication with the server computer 302 through the network 301 in order to carry out a sign-on operation.

After the sign-on operation is completed, the server computer 302 transfers the file 350 to the mobile apparatus 303. When the mobile apparatus 303 receives the transferred file 350, the user transfers the file 350 from the mobile apparatus 303 to the client computer 304. Then, the user utilizes the file 350 through the input unit 321 and the output unit 322, which are provided on the client computer 304.

In addition, U.S. Pat. No. 5,668,876 discloses another system for rendering information services and the like by using a server for users of remote terminals. A pager system is used for authenticating the user and for transmitting information for notifying the user of a response code used for receiving a service.

However, the conventional methods described above have the following problems.

First, with the first method described above, only the input unit 311 and the output unit 312 can be used to utilize a file. In general, the sizes of the input unit 311 and the output unit 312, which are provided on the mobile apparatus 303, are small in comparison with a stationary computer's input unit and output unit respectively. An example of the stationary computer is the so-called desktop computer. The input unit in a stationary computer includes a keyboard and a mouse whereas the output unit thereof includes a display unit. In addition, for the mobile apparatus 303, there are limitations on the input method and the area of the display screen. For these reasons, it is difficult to operate the file in a comfortable manner by using the input unit 311 and the output unit 312.

In addition, in the case of the second method, the user must enter information (such as a password) required for a sign-on operation to the client computer 304 in order to complete the sign-on operation. Thus, if the client computer 304 happens to execute a malicious program by any chance, the program may fetch the information, which is entered by the user and required for the sign-on operation, and information required for transferring the file 350 from the server computer 302 to the client computer 304 after the sign-on operation. The latter information is referred to as credentials, which are stored in a storage unit in the client computer 304 at completion of the sign-on operation. As a result, it is feared that an illegal access to the client computer 304 is made when the user is using the client computer 304 or after the user uses the client computer 304. An illegal access includes the following two cases.

First, one or more files other than the file 350 may be stolen from the server computer 302, or one or more files including the file 350 may be falsified. By using the information entered by the user to the client computer 304 or the credentials stored in a storage unit in the client computer 304 at completion of the sign-on operation, a malicious user or a malicious program is capable of completely becoming the authorized user capable of transferring all files from the server computer 302, deleting the files and rewriting them. These illegal operations are each generally referred to as a break-in operation.

In the second place, it is quite within the bounds of possibility that an illegal access is made during or after use of the client computer 304 so that a sign-on operation can no longer be carried out. Normally, if a plurality of sign-on operations carried out by the same user consecutively all end in a failure, in many cases, the server computer 302 executes a function to disable subsequent sign-on operations carried out by the user. By using the information entered by the user to the client computer 304, the malicious user or the malicious program is capable of deliberately carrying out consecutively sign-on operations that each end in a failure a plurality of times. Thus, even when the user carries out a sign-on operation correctly later on, the sign-on operation has been disabled by the server computer 302. The disability to carry out a sign-on operation is normally referred to as a denial of service attack.

In addition, the client computer 304 is generally a computer open to the public. Thus, a malicious user can execute a malicious program on the client computer 304 with ease in such a way that the user is not aware of the malicious program execution.

Also in a case where the system configuration disclosed in U.S. Pat. No. 5,668,876 cited above is applied to an access to a file from a remote terminal, there is raised a problem that it is quite within the bounds of possibility that a response code transmitted to the remote terminal for the access is fetched by a malicious user from the remote terminal and abused later.

Furthermore, as for a problem of the third method described above, data is transferred from the server computer 302 to the mobile apparatus 303 generally by using a radio/mobile communication technique, which has a low data transmission speed and incurs a high cost for a transfer of data in comparison with a wired/fixed communication technique. Thus, if the size of a file to be transferred is large, there will be raised a problem of a long required transfer time and a high transfer cost.

SUMMARY OF THE INVENTION

It is thus a first object of the present invention addressing the problems described above to provide a file transfer system that allows the user of a mobile apparatus to utilize a file stored in a server computer in a comfortable manner by using any client computer's efficient input unit including a large keyboard and a mouse as well as the client computer's efficient output unit including a large display screen.

In addition, it is a second object of the present invention to provide a file transfer system capable of transferring a desired file while avoiding illegal accesses to the server computer.

Furthermore, it is a third object of the present invention to provide a file transfer system capable of transferring a desired file at a high speed but at a low cost.

In accordance with the present invention, the user carries out a sign-on operation with respect to a server computer (or an authentication process with the server computer) by using a mobile apparatus and, upon completion of the sign-on operation, transmits a request message to the server computer to request the server computer that a file specified in the request message be transferred to a client computer also specified in the request message. In this case, the client computer is installed at any location and normally open to the public.

Receiving a request message, the server computer encrypts a file specified in the request message, and transfers the encrypted file to a client computer also specified in the request message. After the client computer receives the encrypted file from the server computer, by using an input unit and an output unit, which are provided on the client computer, the user can decrypt the encrypted file transferred by the server file and utilize a file obtained as a result of the decryption.

Thus, in accordance with the present invention, the user can comfortably utilize a desired file stored in a server computer by using an input unit and an output unit, which are provided on a client computer installed at any location.

In addition, since the client computer neither inputs information required for a sign-on operation nor stores the information after the sign-on operation, a malicious program is not capable of stealing the information to be used for making an illegal access to the server computer even if the program is executed on the client computer.

Furthermore, since a file desired by the user is transferred directly from the server computer to the client computer, by adoption of the wired/fixed communication technique, the transmission of the file can be carried out at a high speed but at a low cost so that the transfer time and the transfer cost, which are required for the transmission of the file, can be reduced. Moreover, since information exchanged between the mobile apparatus and the server computer by adoption of the wireless/mobile communication technique consists of only data for a sign-on operation and a message used for requesting a transfer of the file, the amount of the information is usually small so that a time and a cost, which are required for carrying out the wireless/mobile communication, can also be reduced as well.

Other and further objects, features and advantages of the invention will appear more fully from the following description.

BRIEF DESCRIPTION OF THE DRAWINGS

In the attached drawings:

FIG. 20 shows the hardware and software configuration of the conventional technology in a simple and plain manner.

DETAILED DESCRIPTION OF THE PREFERRED EMBODIMENTS

Preferred embodiments of the present invention are explained by referring to diagrams as follows.

(1) Hardware Configuration

Figure 1:
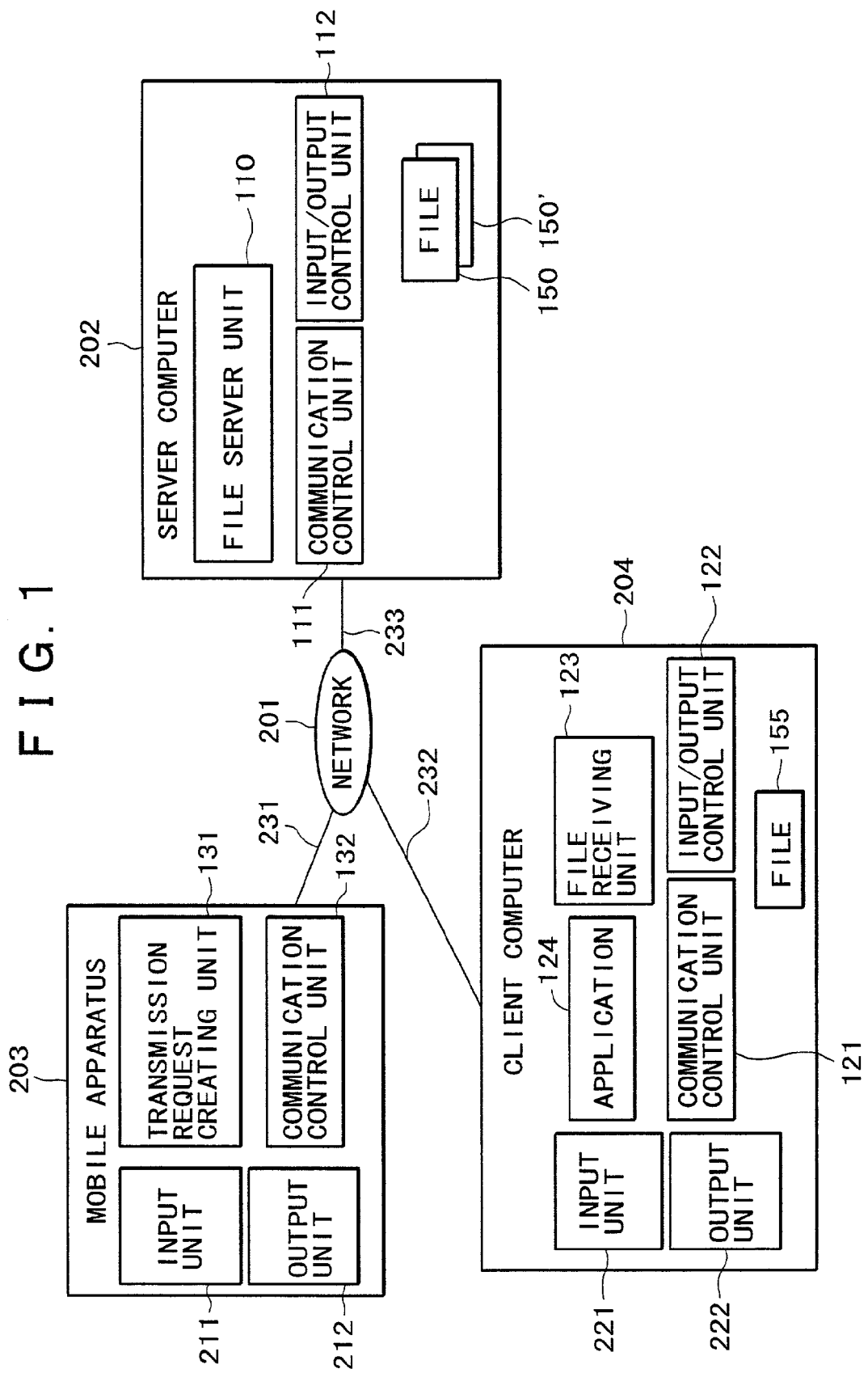
FIG. 1 shows the hardware and software configuration of a first embodiment of the present invention in a simple and plain manner.

By referring to FIG. 1, the following description explains an embodiment's configuration comprising members, which are each normally implemented by hardware. However, the description is not necessarily to be interpreted that the present invention suggests that each of the members explained in the following description must be implemented by hardware.

A server computer (or a second computer) 202 has one or more processors, which are not shown in the figure. In the case of a server computer 202 comprising more than one processor, the processors are connected to each other by an internal network, a LAN or a network 201.

The server computer 202 comprises a file server unit 110, a communication control unit 111, and an input/output control unit 112, which can each implemented by a program. The file server unit 110, the communication control unit 111, and the input/output control unit 112 will be described later. The server computer 202 is typically installed at a location such as the data center of a company or an Internet service provider. Normally, the server computer 202 includes a means for avoiding a variety of illegal accesses.

A mobile apparatus (or a third computer) 203 is a computer having one or more processors, which are not shown in the figure. The mobile apparatus 203 comprises a transmission request creating unit 131 and a communication control unit 132, which can each be implemented by a program.

Usually carried by the user, the mobile apparatus 203 can be interpreted as a PDA (Personal Data Assistant) or a wearable computer.

The mobile apparatus 203 has an input unit 211 operated by the user to enter a command to a program executed in the mobile apparatus 203.

The input unit 211 includes typically a pen input device and a voice input device. In this embodiment, the mobile apparatus 203 has only one input unit 211. However, the mobile apparatus 203 can also have 2 or more input units 211, which are each to be operated by the user to enter a command to a program executed in the mobile apparatus 203.

In addition, the mobile apparatus 203 also has an output unit 212. The output unit 212 displays contents instructed by a program executed in the mobile apparatus 203 in a format that can be understood by the user. In this way, a program executed in the mobile apparatus 203 delivers information to the user.

The output unit 212 typically includes a small display screen and a speaker. While the mobile apparatus 203 has only one output unit 212 in this embodiment, the mobile apparatus 203 can also be provided with two or more output units 212. In this case, a program informs the user of information by using the two or more output units 212.

The client computer (or a first computer) 204 has one or more processors, which are not shown in the figure. The client computer 204 is capable of implementing functions of components such as a communication control unit 121, an input/output control unit 122, a file receiving unit 123 and an application 124 by execution of programs.

The client computer 204 is installed at any locations such as a library, a hotel, a restaurant, and a company office, which is not necessarily the same as the location of the server computer 202. If necessary, the user carrying the mobile apparatus 203 can use the client computer 204 after being approved by the owner of the client computer 204 or the person in charge of the client computer 204.

The client computer 204 has an input unit 221. By operating the client computer 204, the user can give a command to a program executed in the client computer 204.

The input unit 221 typically includes a keyboard, a mouse, and an audio input device. While the client computer 204 has only one input unit 221 in this embodiment, the client computer 204 can also be provided with two or more input units 221. In this case, the user can give a command to a program executed in the client computer 204 by operating the two or more input units 221.

In addition, the client computer 204 also has an output unit 222. The output unit 222 displays information instructed by a program executed in the client computer 204 in a format that can be understood by the user. In this way, a program executed in the client computer 204 delivers information to the user.

The output unit 222 typically includes a large liquid-crystal display screen, a CRT display screen, and a speaker. While the client computer 204 has only one output unit 222 in this embodiment, the client computer 204 can also be provided with two or more output units 222. In this case, a program informs the user of information by using the two or more output units 222.

The network 201 is a communication system comprising exchanges, antennas, routers, gateways, LAN connectors, and cables. The server computer 202, the mobile apparatus 203, and the client computer 204 are connected to the network 201 by links 233, 231, and 232 respectively. The links 231, 232, and 233 do not have to be the same. They can each comprise communication devices or a communication media or their combination. The communication devices or a communication media or their combination are used for implementing communication over a long or short distance, of a wireless or wired type and of a mobile or stationary type.

In this embodiment, in addition to the links 231, 232, and 233, the network 201 may also include other links connected to apparatuses and computers other than the server computer 202, the mobile apparatus 203, and the client computer 204.

The server computer 202, the mobile apparatus 203, and the client computer 204 each have one or more network interfaces, which are not shown in the figure.

At least one of the interfaces provided in the server computer 202 are connected to the link 233 in a communication form compatible with the link 233. Likewise, at least one of the interfaces provided in the mobile apparatus 203 are connected to the link 231 in a communication form compatible with the link 231. Likewise, at least one of the interfaces provided in the client computer 204 are connected to the link 232 in a communication form compatible with the link 232.

The server computer 202 and the client computer 204 each have a storage unit, which is not shown in the figure. The storage unit in the server computer 202 is used for storing files 150 and 150' in accordance with a command issued by a program executed in the server computer 202. Similarly, the storage unit in the client computer 204 is used for storing a file 155 in accordance with a command issued by a program executed in the server computer 202. The storage units each comprise at least one of a main memory, a hard disk, a CD-ROM, and another storage device.

(2) Software Structure

By referring to FIG. 1, the following description describes a configuration of each member that can be implemented by software comprising one or more programs. However, the following description should not be interpreted that the present invention must implement all the members described below as software.

In this embodiment, each piece of software is executed by a processor in the server computer 202, the mobile apparatus 203 or the client computer 204.

These pieces of software are each executed in the server computer 202, the mobile apparatus 203 and the client computer 204 as part of a program referred to as an operating system not shown in the figure or as a program running under management of the operating system.

Each program is executed by a computer when the power supply of the computer is turned on or executed in accordance with a command issued by the operating system running in the computer.

Each program is stored in advance in a memory in a computer for executing the program. As an alternative, a program is executed by a specific computer when the program is transferred from the server computer 202, the mobile apparatus 203, the client computer 204, or another computer not shown in the computer to the specific computer. A program can be transferred from the other computer to the specific computer for execution either automatically or in an operation carried out manually. In this embodiment, a program can be transferred in either way.

The server computer 202 executes a file server unit 110, a communication control unit 111, and an input/output control unit 112.

The file server unit 110 receives a transmission request message from the mobile apparatus 203 through the input/output control unit 112. The transmission request message will be explained later by referring to FIG. 2. The file server unit 110 then authenticates the user to verify that the user sending the transmission request message is an authorized user. After the user is verified to be an authorized user, the file server unit 110 encrypts the contents of a file having a name specified in the transmission request message. The file server unit 110 then calls the input/output control unit 112 to transmit the encrypted contents to the client computer 204 by way of the communication control unit 111.

The communication control unit 111 receives the transmission request message from the network 201 through the link 233, and passes on the message to the file server unit 110.

The communication control unit 111 transmits the encrypted file received from the file server unit 110 to the client computer 204 by way of the link 233 and the network 201.

Called by the file server unit 110, the input/output control unit 112 reads out one of 2 or more files 150 and 150' stored in a storage unit in the server computer 202 as a file having a name specified by the file server unit 110. The storage unit itself is not shown in the figure. The input/output control unit 112 supplies the file to the file server unit 110 in response to the specified file name. For this purpose, the input/output control unit 112 has an internal table showing a relation between file names and locations in the storage unit. The locations in the storage unit means locations at which files indicated by the file names are stored.

The mobile apparatus 203 executes a transmission request creation unit 131 and a communication control unit 132.

The transmission request creation unit 131 creates the transmission request message, which is used for requesting the server computer 202 to transmit a file, in accordance with an input entered by the user. The transmission request creation unit 131 then calls the communication control unit 132 to transmit the transmission request message to the server computer 202.

Called by the transmission request creation unit 131, the communication control unit 132 transmits the transmission request message created by the transmission request creation unit 131 to the server computer 202 by way of the link 231 and the network 201.

The client computer 204 executes a communication control unit 121, an input/output control unit 122, a file reception unit 123, and an application 124.

The communication control unit 121 receives the encrypted file from the server computer 202 through the network 201 and the link 232 and passes on the file to the file receiving unit 123.

Called by the file receiving unit 123 or the application 124, the input/output control unit 122 delivers the file 155 stored in a storage unit in the client computer 204 to the file receiving unit 123 or the application 124, and stores a received file in the storage unit as the file 155. The storage unit is not shown in the figure.

The file receiving unit 123 decrypts an encrypted file received from the communication control unit 121, and calls the input/output control unit 122 to store the file in the storage unit as the file 155.

The application 124 such as a word processor, a program development tool, information viewing software referred to as a browser and tabular computation software calls the input/output control unit 122 to make an access to the file 155 and controls execution of desired processing by typically outputting data to the output unit 222 of the client computer 204 in accordance with inputs entered by the user via the input unit 221 also in the client computer 204.

(3) Network Communication

By referring to FIG. 1, the following description explains a communication technique adopted by the server computer 202, the mobile apparatus 203, and the client computer 204.

A unique network address is assigned to a network interface provided on each of the server computer 202, the mobile apparatus 203, and the client computer 204. In the following description, a unique network address is referred to merely as an address. By using an address, communications between the server computer 202 and the mobile apparatus 203 as well as between the server computer 202 and the client computer 204 are carried out as follows.

A program on the sender side specifies the address of a destination and an area in a storage unit in a command. The area is used for storing data (a file) to be transmitted. Then, the program gives the command to its own network interface to transmit the data stored in the specified area of the storage unit to a network interface, to which the address of a destination is assigned, by way of the network 201. A program on the recipient side stores the data in a specified area of a storage unit.

Pages 171 to 196 of a reference written by Richard S Stevens with a title "UNIX Network Programming" and published by Prentice Hall more concretely describes a communication technique for implementing the above function whereby, when a unique network address assigned to a network interface on the recipient side is specified by a program on the sender side, desired data can be delivered to a program executed in an apparatus including a network interface to which the unique address is assigned.

A computer system provided by the present invention applies the above communication technique. However, this specification does not include a detailed description of the communication technique.

In this embodiment, the mobile apparatus 203 and the client computer 204 are capable of communicating with each other without using the network 201. In addition, it is not necessary to directly connect the client computer 204 to the network 201 by using the link 232. Instead, it is also possible to provide a configuration wherein the client computer 204 is connected to the server computer 202 by a specific link, which is not necessarily a link of the same type as the link 232, and when the client computer 204 carries out a communication by way of the network 201, the communication must always be established through the server computer 202.

(4) Transmission Request Message

Figure 2:
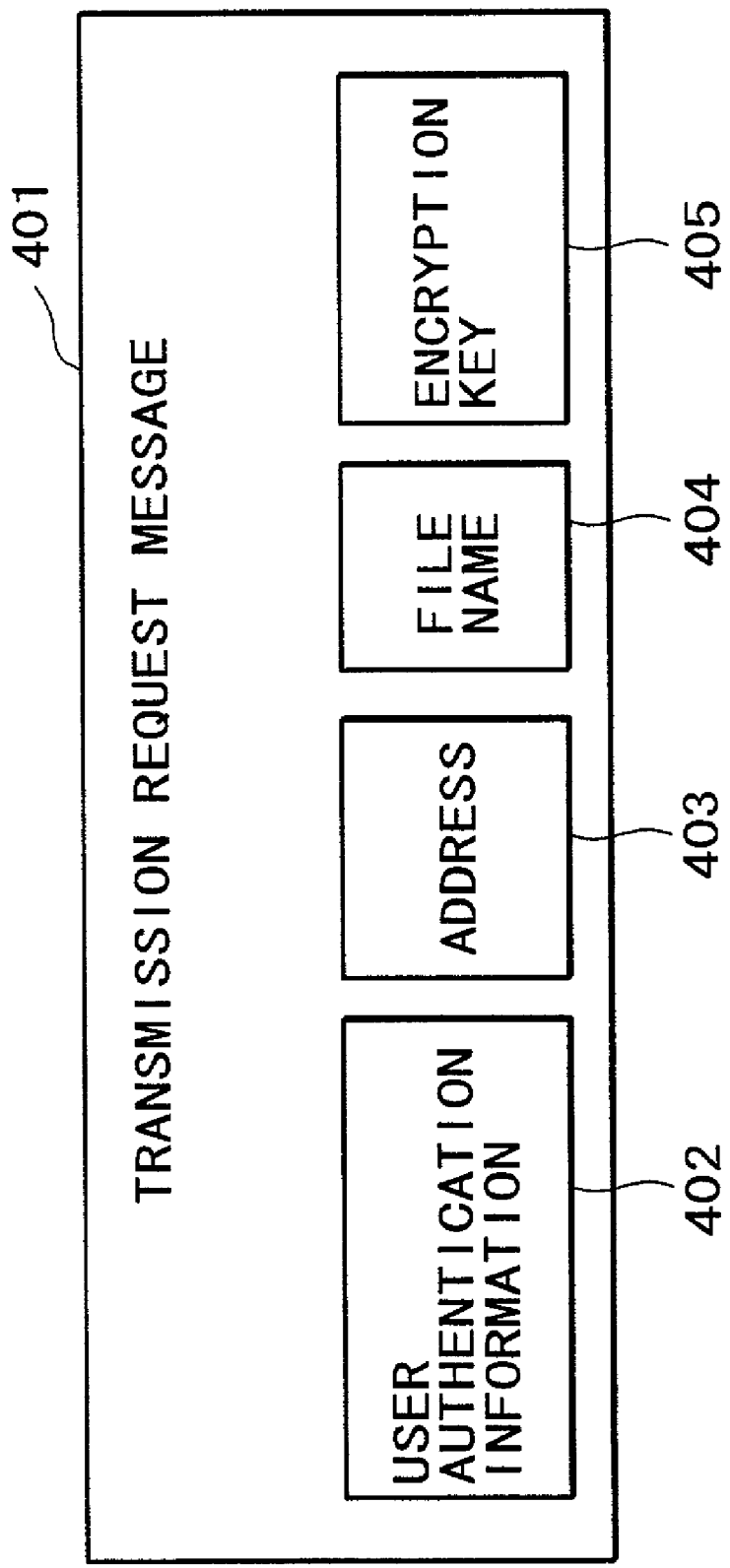
FIG. 2 shows the contents of a transmission request message in a simple and plain manner.

By referring to FIG. 2, the following description explains contents of a transmission request message 401 received from the transmission request creation unit 131 of the mobile apparatus 203 to the file server unit 110 of the server computer 202.

As shown in FIG. 2, the transmission request message 401 includes user authentication information 402, an address 403, a file name 404, and an encryption key 405.

The user authentication information 402, the address 403, the file name 404, and the encryption key 405 in the transmission request message 401 of this embodiment are arranged in the same order they are enumerated here. However, the present invention does not limit the arrangement to this order. In addition, the transmission request message 401 may include other information.

The user authentication information 402 is information used by the file server unit 110 receiving the transmission request message 401 to identify a user who transmitted the transmission request message 401. Normally, the user authentication information 402 includes information such as an identification symbol of the user and the present time. The user authentication information 402 is encrypted by using an encryption algorithm and an encryption key determined in advance by adopting a specific method. The user authentication information 402 thus includes sufficient information to be used by the file server unit 110 receiving the transmission request message 401 for detecting an illegal user who sent the transmission request message 401 by completely becoming the authorized user as a result of falsification of the user authentication information 402 by a person other than the authorized user or a program.

In particular, the user authentication information 402 may also include information peculiar to the mobile apparatus 203 in addition to information on the user. An example of the information peculiar to the mobile apparatus 203 is a manufacturing serial number. As a method of creating such user authentication information, it is possible to use a technique described in, among other documents, a reference called RFC 1617 authored by J. Francs, P. Hallam—Baker, J. Hostetler, S. Laurence, P. Leach, A. Luotonen, E. Sink, and L. Stewart with a title of "HTTP Authentication: Basic and Digest Access Authentication."

In the present invention, the information included in the user authentication information 402 needs to be sufficient information to be used by the file server unit 110 receiving the transmission request message 401 to carry out user authentication including detection of an illegal user's act to completely become an authorized user. This embodiment adopts a method identical with or equivalent to the method already described in the reference authored by J. Francs et al. For this reason, this specification omits a detail description of the method.

In some cases, in dependence on the method of creating the user authentication information 402, a sign-on operation (or a login operation or a sign-on preparation) must be carried out in the mobile apparatus 203 to transmit a message from the mobile apparatus 203 to the server computer 202, requesting the server computer 202 that information to be used as a base for creating the user authentication information 402 be transmitted from the server computer 202 to the mobile apparatus 203.

In the following description of this embodiment, it is assumed that, if necessary, a sign-on operation has already been completed and information serving as a base for creation of the user authentication information 402 has been stored in the mobile apparatus 203.

The address 403 shown in FIG. 2 is the address of the client computer 204.

The file name 404 is information for specifying any one of the files 150, 150', and so on, which are stored in the storage unit of the server computer 202. The file name 404 may specify more than one file.

The encryption key 405 is an encryption key used for encrypting a file indicated by the file name 404 prior to transmission of the file from the server computer 202 to the client computer 204.

(5) Operation Carried Out by the User to View a File

Figure 3:
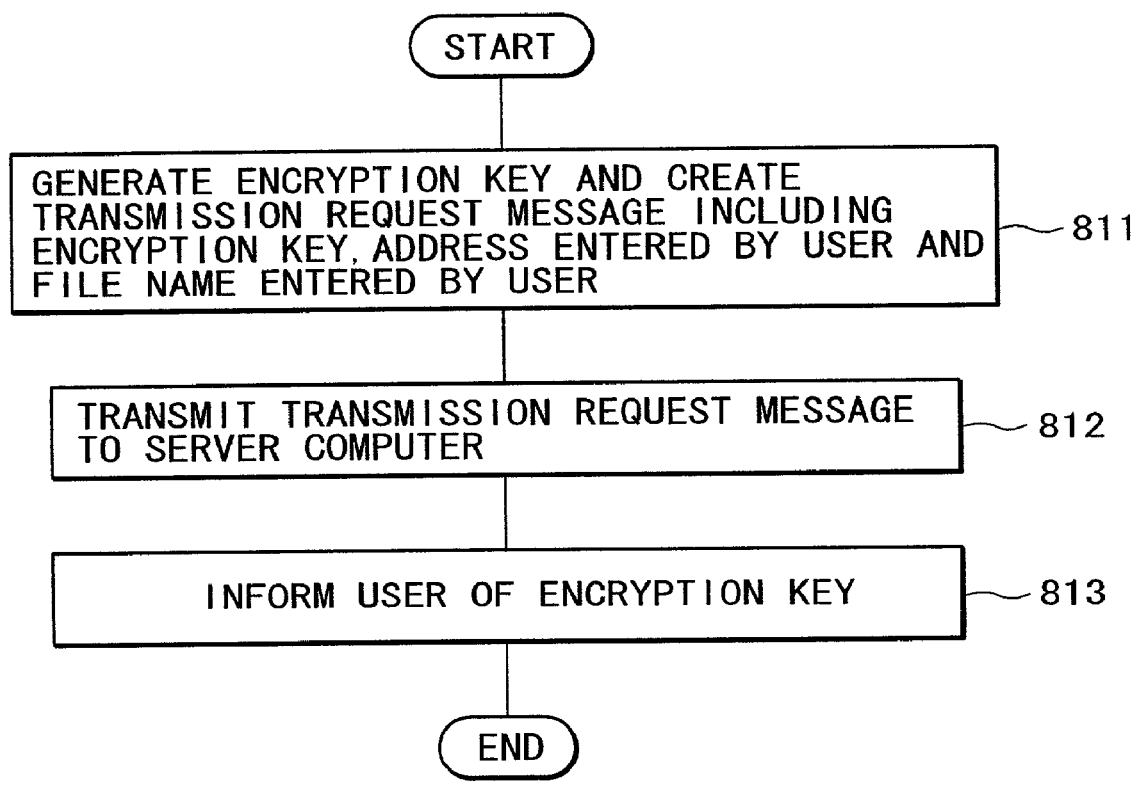
FIG. 3 is a flowchart representing processing carried out by a mobile apparatus.
Figure 4:
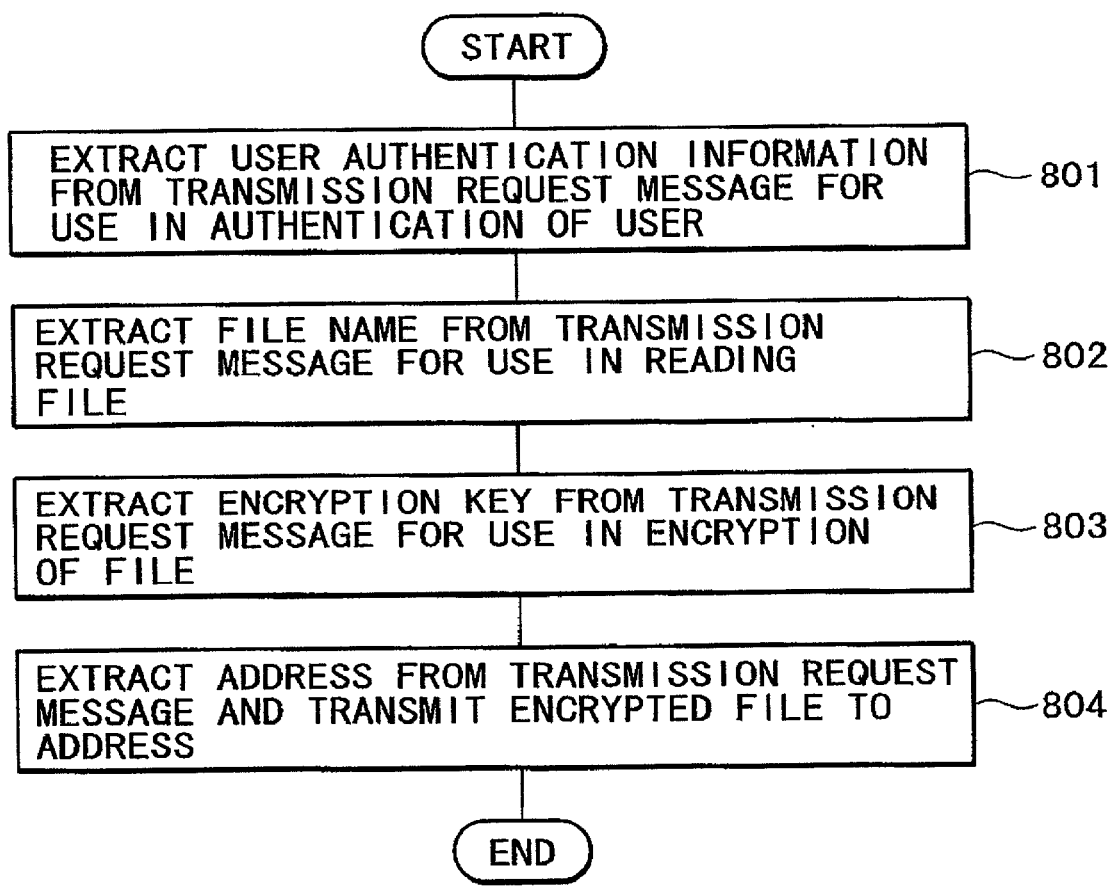
FIG. 4 is a flowchart representing processing carried out by a server computer.
Figure 5:
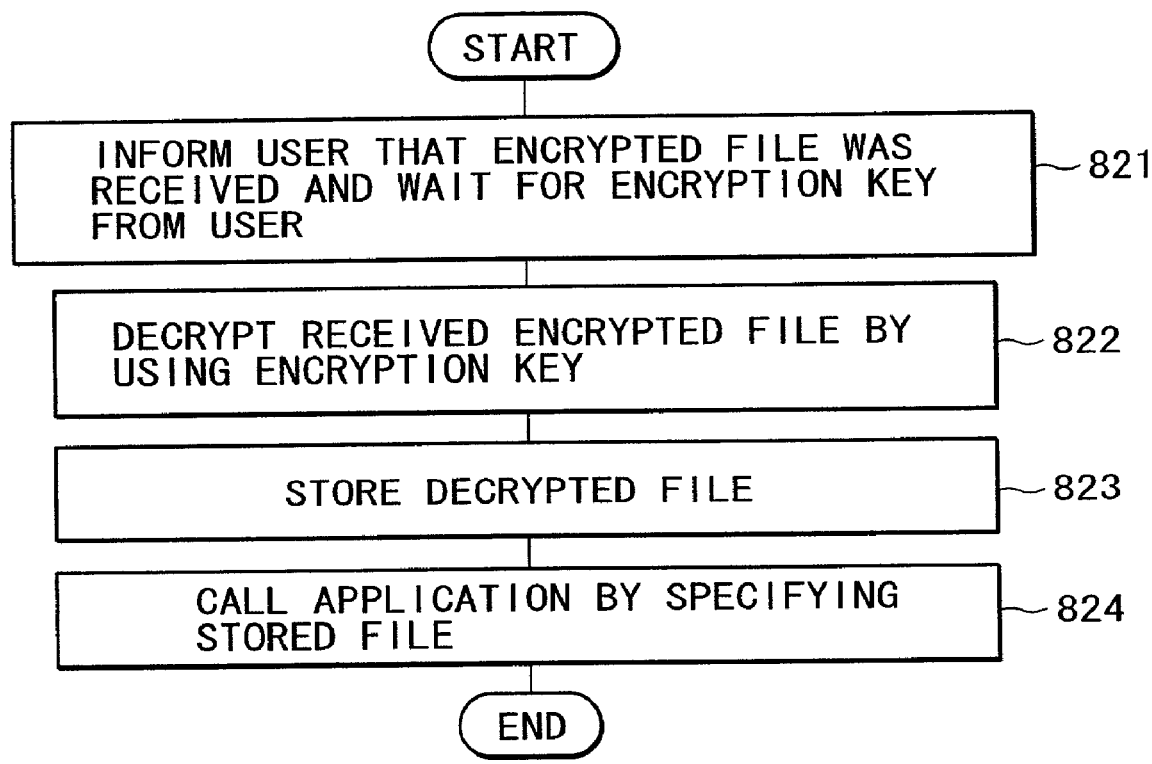
FIG. 5 is a flowchart representing processing carried out by a client computer.

In this embodiment, when the user carrying the mobile apparatus 203 wants to utilize contents of the file 150 stored in the storage unit of the server computer 202 by execution of the application 124 in the client computer 204, the user needs to follow procedures shown in FIGS. 3 to 5.

As a first step, the user acquires the address of the client computer 204. As a method of acquiring the address, the user can ask the owner of the client computer 204 or the person in charge of the client computer 204 for the address. As an alternative, management software of the client computer 204 is executed to find out setting contents of the client computer 204.

As a second step, the user operates the input unit 211 in the mobile apparatus 203 to enter the address of the client computer 204 and the name of the file 150 to the transmission request creation unit 131.

As a third step, the transmission request creation unit 131 receiving the address of the client computer 204 and the name of the file 150 creates the transmission request message 401 shown in FIG. 2.

More concretely, the transmission request creation unit 131 creates the information used for authenticating the user as already described earlier and stores the information in the user authentication information 402 of the transmission request message 401 shown in FIG. 2. The transmission request creation unit 131 stores the address of the client computer 204 in the address 403 and stores the name of the delivered file 150 in the file name 404. A symbol generated arbitrarily is stored in the encryption key 405. The encryption key 405 needs to be a symbol that unexpectedly varies from transmission request message to transmission request message. The symbol can be a random number or a result of computation based on a calculation formula applied to a portion of the whole of the user authentication information 402, the address 403 or the file name 404. The steps 1 to 3 described above correspond to a step 811 of a flowchart shown in FIG. 3.

As a fourth step, the transmission request creation unit 131 completing creation of a transmission request message calls the communication control unit 132 to transmit the message to the server computer 202 at a step 812 of the flowchart shown in FIG. 3.

At that time, the address of the server computer 202 sometimes need be specified. However, it is assumed that the address is known for a reason such as the fact that the server computer 202 is a computer always used by the user or a computer with an address disclosed to the public or the fact that the address is remembered by the user or the address is stored in a memory or the mobile apparatus 203.

As a fifth step, the transmission request creation unit 131 uses the output unit 212 to inform the user of the encryption key at a step 813 of the flowchart shown in FIG. 3.

The transmission request message is received by the file server unit 110 through the communication control unit 111 in the server computer 202.

As a sixth step, receiving the transmission request message, the file server unit 110 in the server computer 202 fetches the user authentication information from the message and uses the information for authenticating the user in order to determine whether the user sending the message is the authorized user at a step 801 of a flowchart shown in FIG. 4.

As a seventh step, the file server unit 110 fetches the file name from the transmission request message and calls the input/output control unit 112 in order to acquire the file 150 indicated by the file name at a step 802 of the flowchart shown in FIG. 4.

As an eighth step, the file server unit 110 fetches the encryption key 405 from the transmission request message and uses the encryption key 405 to encrypt the file 150 at a step 803 of the flowchart shown in FIG. 4.

As a ninth step, the file server unit 110 fetches the address 403 from the transmission request message and calls the communication control unit 111 in order to transmit the encrypted file to the address at a step 804 of the flowchart shown in FIG. 4.

The file 150 encrypted by the server computer 202 is transmitted to the client computer 204 by way of the network 201. In the client computer 204, the encrypted file is received by the file receiving unit 123 through the communication control unit 121.

As a tenth step, receiving the encrypted file, the file receiving unit 123 informs the user through the output unit 222 in the client computer 204 that the file has been received and waits for entry from the user at a step 821 of a flowchart shown in FIG. 5.

As an eleventh step, when informed through the output unit 222 that the file has been received, the user enters the encryption key 405 via the output unit 222 in the client computer 204. The user has been notified of the encryption key 405 through the output unit 212 in the mobile apparatus 203.

As a twelfth step, the file receiving unit 123 receiving the encryption key 405 through the input unit 221 decrypts the encrypted file by using the encryption key 405 at a step 822 of the flowchart shown in FIG. 5.

As a thirteenth step, the file receiving unit 123 calls the input/output control unit 122 to store the decrypted file as a file 155 at a step 823 of the flowchart shown in FIG. 5.

As a fourteenth step, the file receiving unit 123 calls the application 124 with the file 155 specified at a step 824 of the flowchart shown in FIG. 5. In addition, the file receiving unit 123 informs the user through the output unit 222 that the file 155 has been stored. The user can thus activate or invoke the application 124.

As a fifteenth step, the user utilizes the application 124 by using the input unit 221 and the output unit 222, which are employed in the client computer 204, in order to view the file 155.

Thus, receiving a file transfer command from the mobile apparatus 203, the server computer 202 authenticates the user and then encrypts the requested file by using the encryption key 405 prior to transmission of the encrypted file to the client computer 204. Then, the user enters the encryption key 405 output to the mobile apparatus 203 to the client computer 204 to be used for decrypting the encrypted file received from the server computer 202 so that the user can utilize the decrypted file 155 in the client computer 204.

As is obvious from the above description, an operation to view a file in this embodiment has the following three effects.

In the first place, the user can view a file 150 stored in the server computer 202 by execution of the application 124 in the client computer 204. Since the input unit 221 in the client computer 204 is an input unit having a big size in comparison with the input unit 211 in the ordinary mobile apparatus 203 and the output unit 222 in the client computer 204 is an output unit having a big screen in comparison with the output unit 212 in the ordinary mobile apparatus 203, the input unit 221 and the output unit 222 can be used very easily so that the user can view the file 150 comfortably.

In the second place, in order for the user to view a file by using the client computer 204, the user needs to enter information consisting of only an encryption key and the name of the file to be viewed to the client computer 204. Information such as a password entered by the user for a sign-on operation via the mobile apparatus 203 and information included in the transmission request message are neither generated in the client computer 204 nor entered to the client computer 204.

Thus, even if a malicious program is executed on the client computer 204 in a way of which the user is not aware of, the program cannot acquire information required for making an illegal access to the server computer 202 while the user is utilizing the client computer 204 or after the user has utilized the client computer 204. As a result, the user can view a file stored in the server computer 202 by using the client computer 204 without getting into danger of an illegal access to the server computer 202.

In the third place, in order to view a file, the transmission request message can be roughly considered to be the only data to be transmitted through the link 231. The file encrypted by the server computer 202 is transmitted to the client computer 204 by way of the link 232.

Normally based on wireless/mobile communication, the link 231 has a low communication speed and imposes a high communication cost per data unit in comparison with the link 232, which is based on the wired/fixed communication. Thus, in accordance with the present invention, a file can be transmitted at a high speed and a low cost through the link 232.

In addition, the viewing of a file in accordance with this embodiment has the following effects.

In the fourth place, the user carries out an operation required for authentication of the user itself by always operating the input unit 211 and the output unit 212, which are employed in the same mobile apparatus 203, by being not restricted by the type of the client computer 204 used for viewing the file 150.

In addition, the processing to authenticate the user is carried out by exchanging information between the mobile apparatus 203 and the server computer 202 only without involvement of the client computer 204. In general, the user needs to carry out an operation, which is complicated to a certain degree, in order to have the user itself authenticated by the server computer 202. This is because the operation includes the sign-on operation and an operation to enter a user name and a password to the mobile apparatus 203. In accordance with this embodiment, however, the user needs only to carry out an operation to have the user itself authenticated by adoption an already known method and by using a well familiar input unit 211 and a well familiar output unit 212, which are employed in the mobile apparatus 203 the user gets used to, by being not restricted by the type and the installation location of the client computer 204.

In the fifth place, in accordance with this embodiment, the application 124 executed on the client computer 204 merely manipulates the file 155 while having an interactive conversation with the user by using the input unit 221 and the output unit 222. Thus, as the application 124, presently available software such as a variety of word processors can be used as it is.

In the sixth place, in accordance with this embodiment, the file received by the client computer 204 has been encrypted and cannot be decrypted unless the user enters the encryption key to the client computer 204. Thus, even if the user inadvertently carries out an incorrect operation, entering the address of another client computer instead of the address of the client computer 204 to the mobile apparatus 203, the user of the other client computer is not capable of viewing the contents of the file. As a result, information can be prevented from being leaked out even in the case of an incorrect operation so that a file can be transferred with a high degree of security. In addition, the user may inadvertently carry out an incorrect operation, entering another user name instead of the correct user name. In this case, if the user is aware of the mistake before the user enters the encryption key to the client computer 204, the encrypted file received by the client computer 204 cannot be decrypted. Even if a malicious program is executed on the client computer 204, the contents of the transmitted file requested mistakenly by the user will not be delivered to an unintended user.

As explained in the above description, the user transfers a file stored in the server computer 202 to the client computer 204. However, the user is also allowed to transmit other information stored in the server computer 202 to a destination by using an email.

When transferring information by using an email, for example, the user needs to specify the identification of the email for transferring the information, the name of the file containing the information, and a mail address that can be used in the client computer 204 to the mobile apparatus 203 as the destination of the transfer. After the email identified by the identifier has been transmitted by the client computer 204, the user can view the transmitted email in the client computer 204 by specifying the email address.

Figure 6:
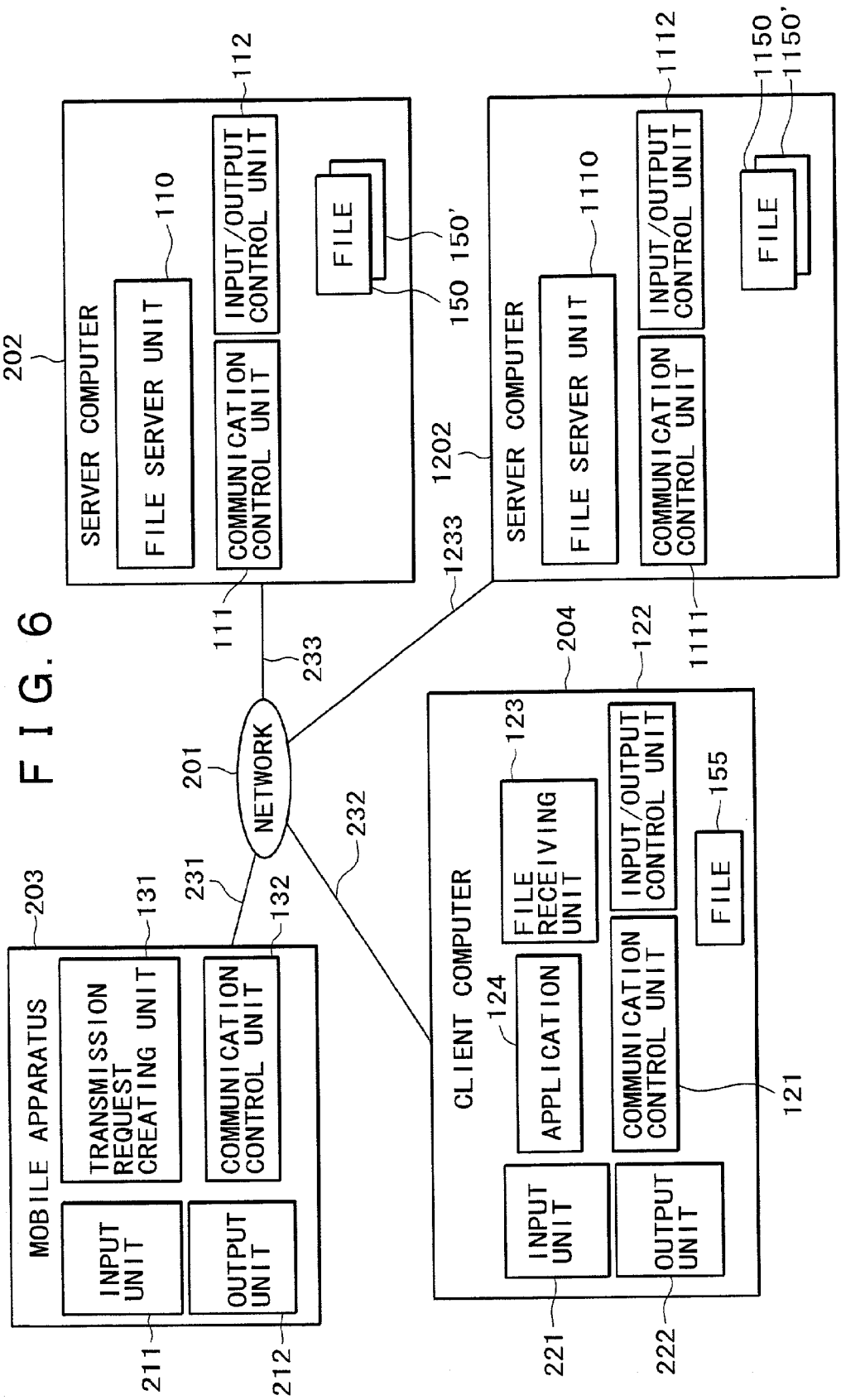
FIG. 6 shows the hardware and software configuration of a second embodiment of the present invention in a simple and plain manner.
Figure 7:
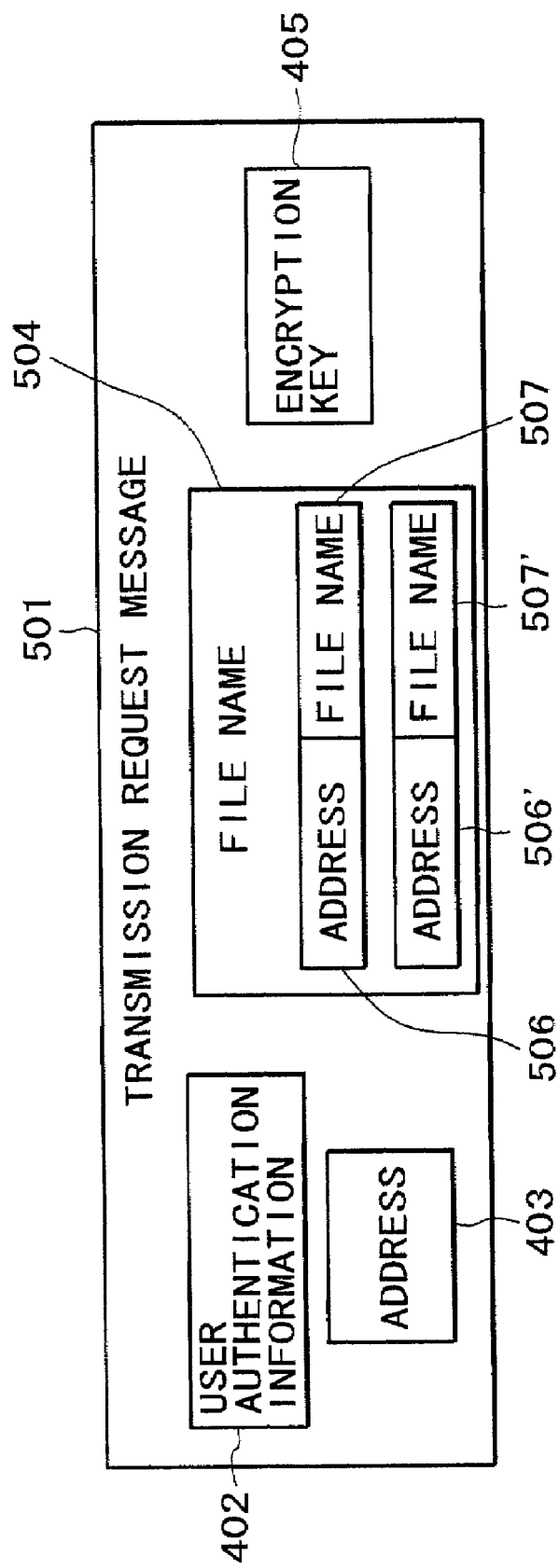
FIG. 7 shows the contents of a transmission request message in a simple and plain manner.

FIGS. 6 and 7 are diagrams showing a second embodiment in which a plurality of files are obtained from a plurality of server computers at the same time, and utilized by using the client computer 204.

The server computer 202, the mobile apparatus 203 and the client computer 204, which are shown in FIG. 6, are identical with those employed in the first embodiment shown in FIG. 1. In addition, the second embodiment also includes another server computer 1202, which is connected to the network 201 by a link 1233.

A file server unit 1110, a communication control unit 1111 and an input/output control unit 1112, which are employed in the other server computer 1202, have the same configurations as the respective counterparts in the server computer 202. In the other server computer 1202, files 1150, and 1150' are stored.

The user carrying a mobile apparatus 203 can transfer a plurality of files 150 and 1150, which are stored in a plurality of server computers 202 and 1202 respectively, to the client computer 204, and view the files 150 and 1150 in the client computer 204.

A plurality of desired files are stored in the server computer 202 and/or the other server computer 1202, which have different assigned addresses 506 and 506' respectively shown in FIG. 7. Assume that the desired files are a file 150 stored in the server computer 202 having the assigned address 506 under a file name 507 and a file 1150 stored in the server computer 1202 having the assigned address 506' under a file name 507'.

The following explains an operation carried out by the user to view a plurality of files.

First, at a first step, the user obtains the address of the client computer 204 in the same way as the first embodiment.

At a second step, by carrying out the same operation as the first embodiment, a combination of the address 506 and the file name 507 and a combination of the address 506' and the file name 507' are entered to the mobile apparatus 203.

At a third step, the transmission request creation unit 131 in the mobile apparatus 203 creates a transmission request message 501 shown in FIG. 7.

The transmission request message 501 is the same as the first embodiment's transmission request message 401 shown in FIG. 2 except that the file name 404 of the transmission request message 401 is replaced by a file name 504 in the transmission request message 501. The file name 504 comprises the combination of the address 506 and the file name 507 as well as the combination of the address 506' and the file name 507', which are information entered by the user as described above.

The subsequent fourth to sixth steps are the same as the first embodiment. At these steps, the transmission request message 501 is transmitted to the server computer 202 and the other server computer 1202, the user is informed of the encryption key 405 and the server computer 202 as well as the other server computer 1202 each authenticate the user sending the transmission request message 501.

At a seventh step, the file server units 110 and 1110 in the server computer 202 and the other server computer 1202 respectively fetch the file name 504 from the received transmission request message 501. The file server units 110 and 1110 then extracts the combination of the address 506 and the file name 507 and the combination of the address 506' and the file name 507'. The server computer 202 having the assigned address 506 acquires the file 150 indicated by the file name 507 whereas the other server computer 1202 having the assigned address 506' acquires the file 1150 indicated by the file name 507'.

At an eighth step, the file server units 110 and 1110 encrypt the files 150 and 1150 respectively by using the encryption key 405. At a ninth step, the communication control units 111 and 1111 are called to transmit the encrypted files 150 and 1150 respectively to the client computer 204.

In this way, the server computers 202 and 1202 transmit the encrypted files 150 and 1150 to the client computer 204 by way the network 201. In the client computer 204, the encrypted files 150 and 1150 are received by the file receiving unit 123 through the communication control unit 121.

At a tenth step, much like the first embodiment, receiving the encrypted files 150 and 1150, the file receiving unit 123 in the client computer 204 informs the user that the encrypted files 150 and 1150 have been received through the output unit 222 in the client computer 204 and waits for the user to enter an input.

At an eleventh step, much like the first embodiment, when informed of the fact that the encrypted files 150 and 1150 have been received through the output unit 222, the user operates the input unit 221 in the client computer 204 to enter the encryption key 405.

At a twelfth step, the file receiving unit 123 decrypts the encrypted files 150 and 1150 by using the encryption key 405 entered by the user.

In addition, at a thirteenth step, the file receiving unit 123 calls the input/output control unit 122 to store the files 150 and 1150 in the storage unit in the client computer 204.

By execution of the procedure described above, one or more files stored separately in a plurality of server computers 202 and 1202 can be transmitted to the client computer 204 to be stored in the storage unit in the client computer 204 in merely one operation. Then, one selected among the files stored in the storage unit can be viewed (or utilized) through the application 124.

Figure 8:
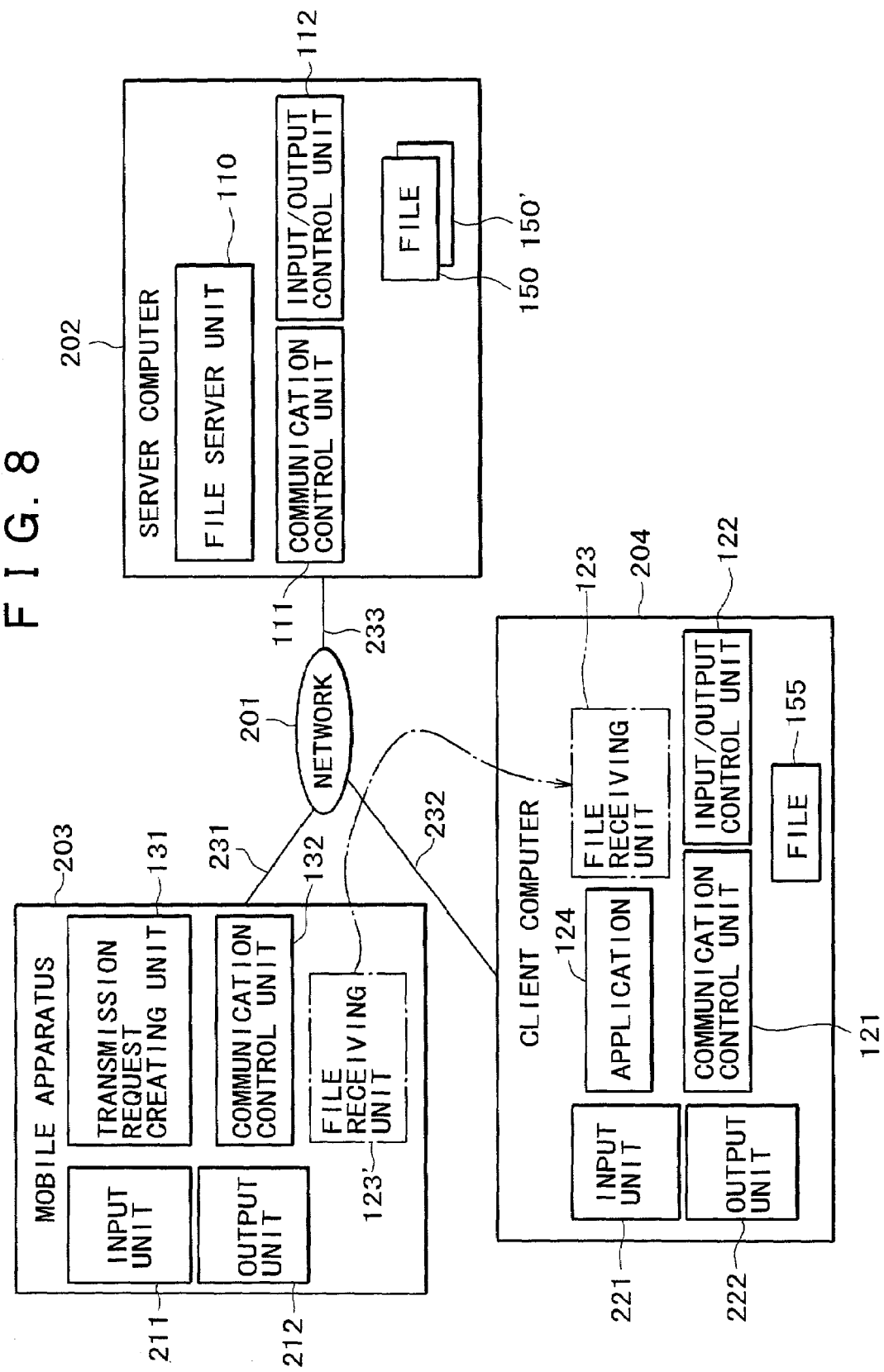
FIG. 8 shows the hardware and software configuration of a third embodiment of the present invention in a simple and plain manner.

FIG. 8 is a block diagram showing the configuration of a third embodiment. The figure shows a case in which the client computer 204 in the first embodiment shown in FIG. 1 does not include a program for implementing the file receiving unit 123. In this case, it is necessary to install the file receiving unit 123 in the client computer 204 from the mobile apparatus 203 as shown in the figure prior to execution of the first to fifteenth steps of the first embodiment.

The user carries the mobile apparatus 203 for also storing the file 123' in the mobile apparatus 203 as software in advance. Normally, the file 123' can be stored as a file. Thus, the file 123' is stored in the mobile apparatus 203 as a file.

Prior to execution of the first step of the first embodiment, the user operates the mobile apparatus 203 and the client computer 204 to transfer the file 123' stored in the mobile apparatus 203 to the client computer 204 in order to install the file receiving unit 123 included in the file 123' in the client computer 204.

The file 123' can be transferred through the links 231 and 232. As an alternative, it is possible to transfer the file 123' through a communication means provided between the mobile apparatus 203 and the client computer 204 separately from the links 231 and 232. The communication means can be based on the wireless/mobile communication technique or the wired/fixed communication technique. The other configurations and the rest of procedure are the same as the first embodiment.

In accordance with the third embodiment, even if the program implementing the file receiving unit 123 is not stored in the client computer 204, the user can view a file stored in the server computer 202 by using the client computer 204.

In particular, since the mobile apparatus 203 and the client computer 204 are normally close to each other, there exists a means such as Bluetooth for transferring a file at a high speed through wireless/mobile communication. If such a means is used for transferring a file, the work to install the file receiving unit 123 in the client computer 204 can be done with little labor and in a short period of time.

Figure 9:
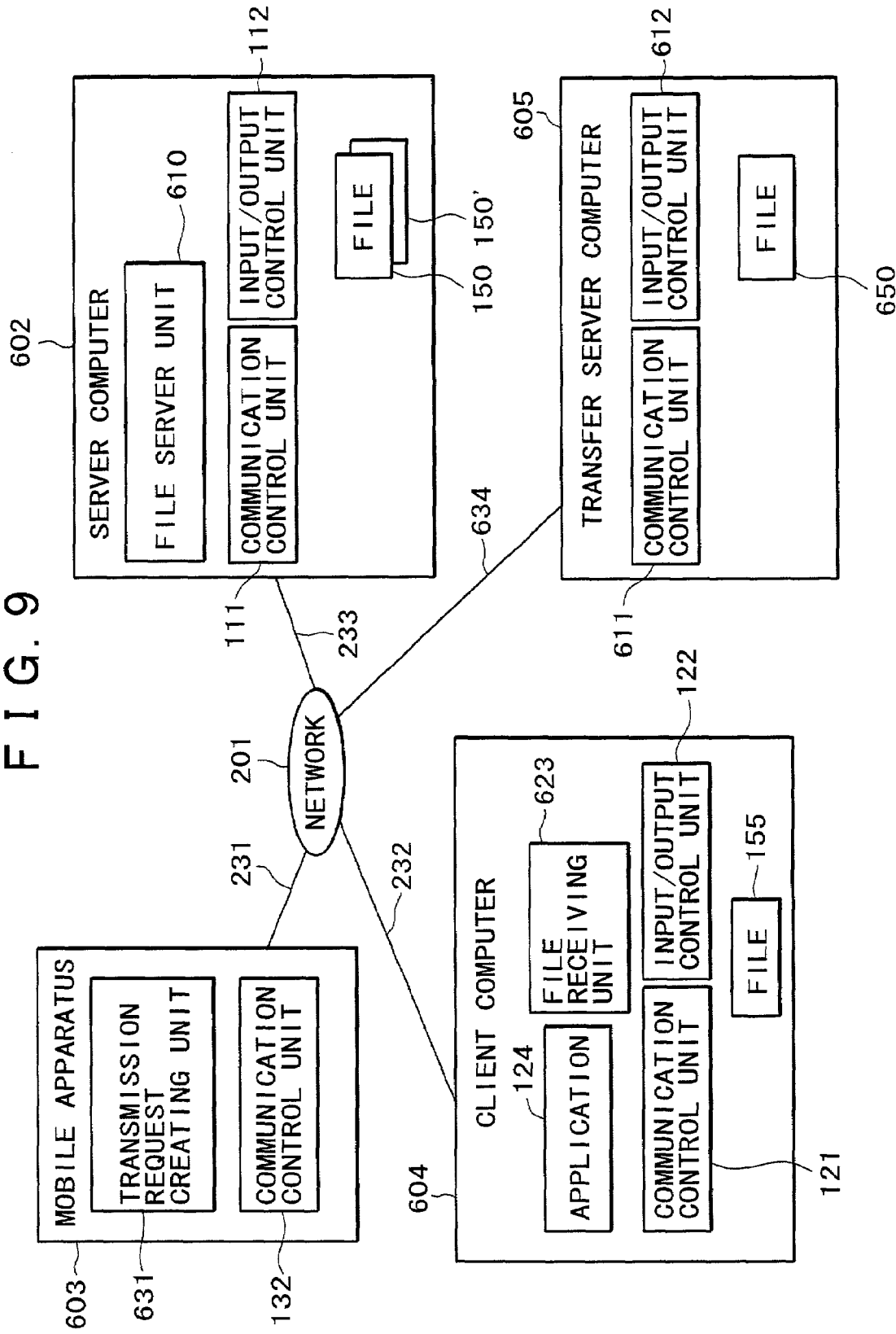
FIG. 9 shows the hardware and software configuration of a fourth embodiment of the present invention in a simple and plain manner.

FIG. 9 is a block diagram showing the configuration of a fourth embodiment. As shown in the figure, the fourth embodiment includes a transfer server computer 605 for exchanging an encrypted file between the server computer 602 and the client computer 604, which are also included in the first embodiment. The transfer server computer 605 is also referred to as a fourth computer.

In the fourth embodiment shown in FIG. 9, the server computer 602 includes a file server unit 610, which carries out processing different from the file server unit 110 of the server computer 202 shown in FIG. 1 as will be described later. The rest of the server computer 602 is the same as the server computer 202. The fourth embodiment's components identical with their respective counterparts in the first embodiment are denoted by the same reference numerals as the counterparts and their description is not repeated.

The file server unit 610 calls the communication control unit 111 to transmit a file obtained as a result of a process to encrypt the file 150 and the name of the file 150 to the transfer server computer 605.

In addition, the mobile apparatus 603 includes a transmission request creation unit 631, which carries out processing different from the transmission request creation unit 131 of the mobile apparatus 203 as will be described later. The rest of the mobile apparatus 603 is the same as the mobile apparatus 203. Much like the first embodiment, the mobile apparatus 603 of the fourth embodiment has the input unit 211 and the output unit 212, which are not shown in FIG. 9.

The transmission request creation unit 631 in the mobile apparatus 603 creates a transmission request message including all information included in the first embodiment's transmission request message 401 shown in FIG. 2 except that the address 403 of the client computer 604 is excluded.

In addition, the client computer 604 executes a file receiving unit 623 that has a processing substance different from the first embodiment's file receiving unit 123 shown in FIG. 1 as will be described later. The rest of the client computer 604 is the same as the client computer 204.

The file receiving unit 623 has a transfer-request-creating unit for creating a transfer request message including a file name and the address of the transfer server computer 605 and an encryption & decryption unit for decrypting a file received from the transfer server computer 605 by using an encryption key 405 entered by the user. The file name and the address of the transfer server computer 605 set in advance are also entered by the user.

The transfer server computer 605 for exchanging an encrypted file between the server computer 602 and the client computer 604 is a computer similar to the server computer 602 and connected to the network 201 by a link 634. In addition, the transfer server computer 605 executes a communication control unit 611 and an input/output control unit 612 and has a storage unit, which can be used for storing a file 650.

The communication control unit 611 receives an encrypted file from the server computer 602 and supplies the file to the input/output control unit 612. In addition, the communication control unit 611 receives a transfer request message from the client computer 604 and requests the input/output control unit 612 to read out an encrypted file 650 indicated by a file name included in the transfer request message. A file 650 read out is then transferred to the client computer 604 originating the transfer request message.

The input/output control unit 612 stores and retrieves an encrypted file 650 in response to a request made by the communication control unit 611.

By referring to flowcharts shown in FIGS. 10 to 15, the following description explains processing carried out by the mobile apparatus 603, the server computer 602, the transfer server computer 605, and the client computer 604.

Figure 10:
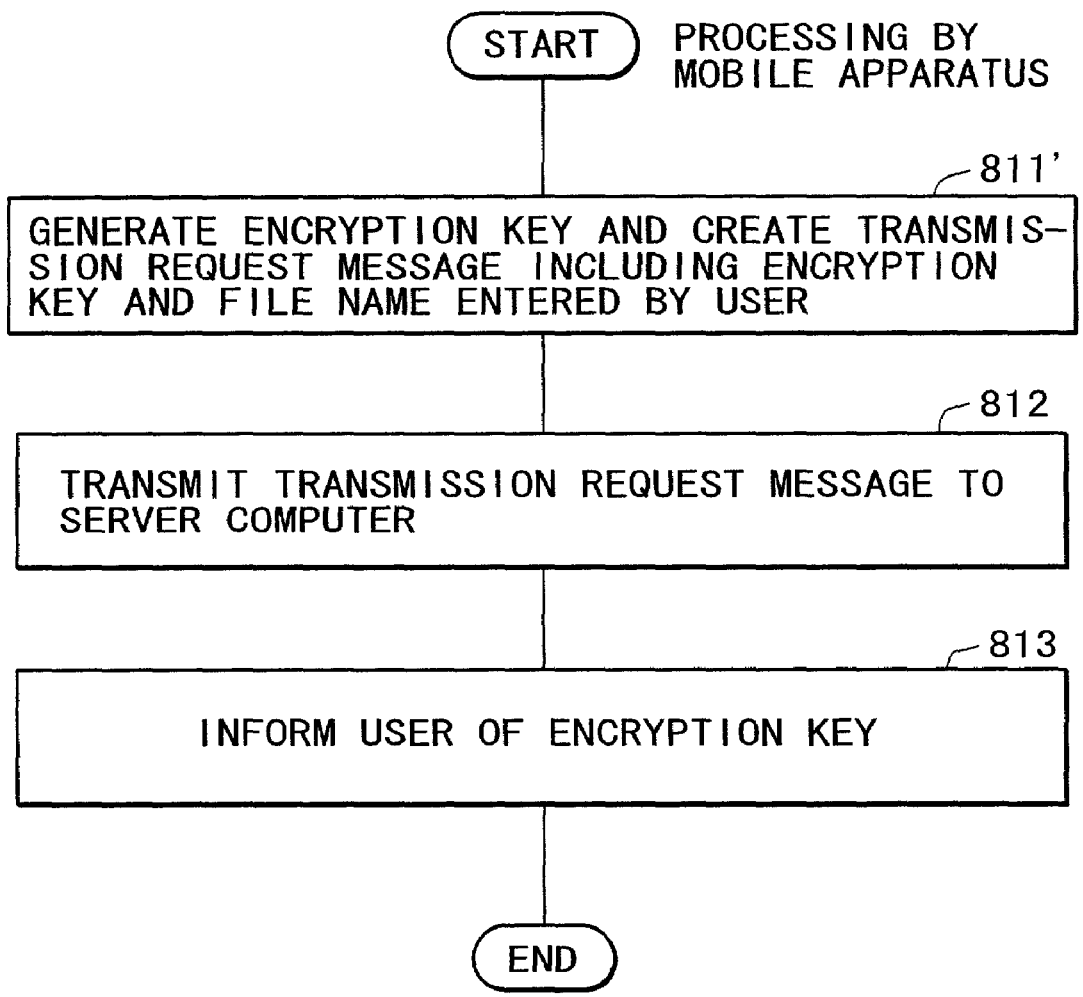
FIG. 10 is a flowchart representing processing carried out by a mobile apparatus.

First, the mobile apparatus 603 executes processing represented by the flowchart shown in FIG. 10.

At a step 811' of the flowchart shown in FIG. 10, the user operates the input unit in the mobile apparatus 603 to enter the name of a file 150 to the transmission request creation unit 631. Unlike the second step of the first embodiment, that is, the step 811 of the flowchart shown in FIG. 3, the address of the client computer 604 is not entered.

Then, the transmission request creation unit 631 receiving the name of a file 150 creates a transmission request message similar to the first embodiment's transmission request message shown in FIG. 2 except that the address 403 of the client computer 604 is not included in the transmission request message 401 created by the transmission request creation unit 631.

The next steps 812 and 813 of the flowchart shown in FIG. 10 are the same as the counterpart steps of the flowchart shown in FIG. 3 for the first embodiment. At those steps, the transmission request creation unit 631 creating the transmission request message calls the communication control unit 132 to transmit the transmission request message to the server computer 602, and the transmission request creation unit 631 uses the output unit 212 to inform the user of an encryption key.

Figure 11:
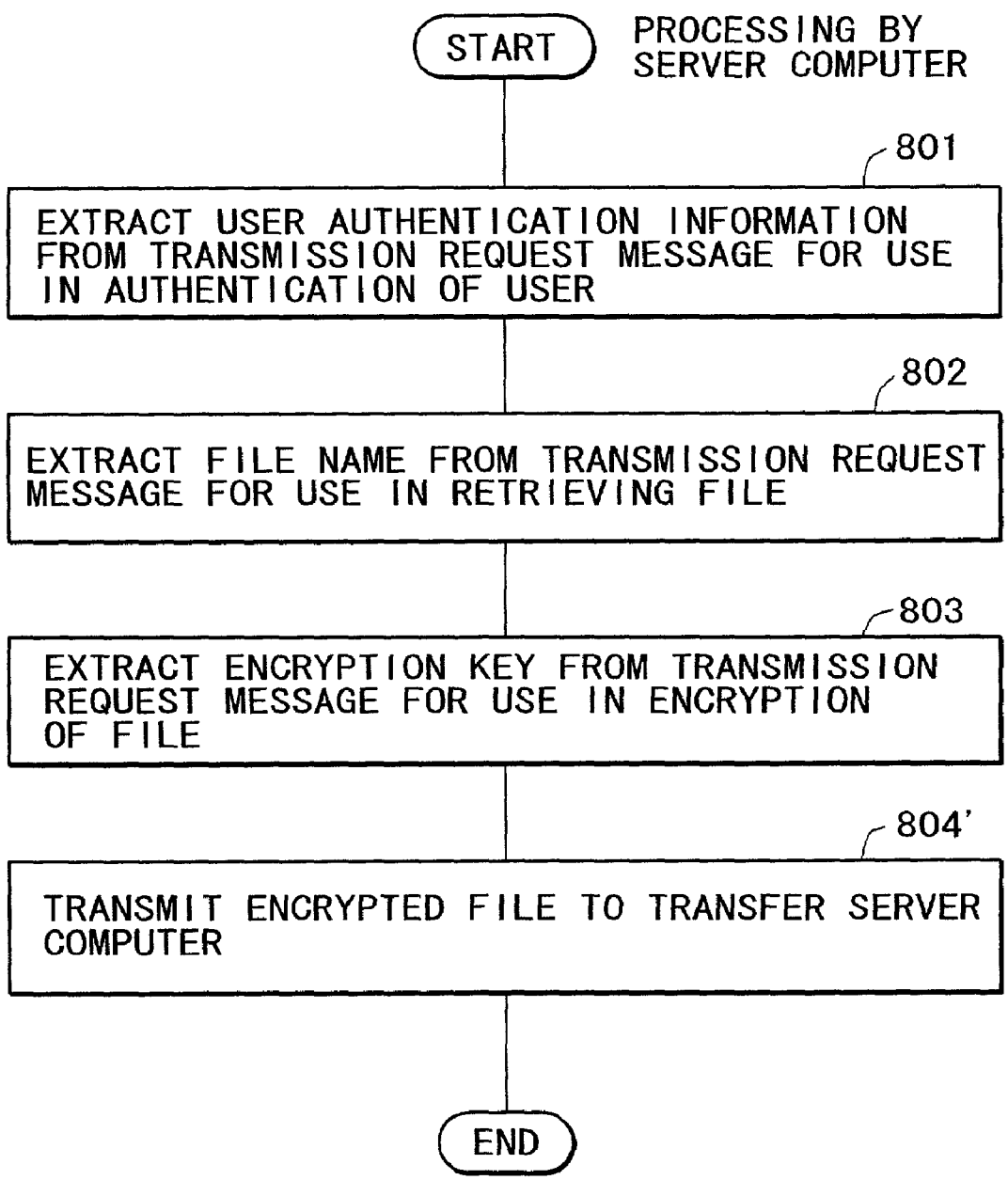
FIG. 11 is a flowchart representing processing carried out by a server computer.

Next, receiving the transmission request message from the mobile apparatus 603, the server computer 602 carries out processing represented by the flowchart shown in FIG. 11.

Steps 801 and 803 of the flowchart shown in FIG. 11 are similar to the counterpart steps of the flowchart shown in FIG. 4 for the first embodiment. At those steps, first, the file server unit 610 fetches the user authentication information from the transmission request message and authenticates the user. Then, the file server unit 610 calls the input/output control unit 112 to acquire a file 150 indicated by the file name and fetches the encryption key 405 from the transmission request message to encrypt the file 150.

At the next step 804' of the flowchart shown in FIG. 11, the file server unit 610 calls the communication control unit 111 to transmit the encrypted file to the transfer server computer 605 set in advance. The address of the transfer server computer 605 and the authentication relation are set in advance.

Receiving the encrypted file from the server computer 602, the transfer server computer 605 carries out processing represented by the flowchart shown in FIG. 12 and, receiving a transfer request message to be described later from the client computer 604, the transfer server computer 605 carries out processing represented by the flowchart shown in FIG. 13.

Figure 12:
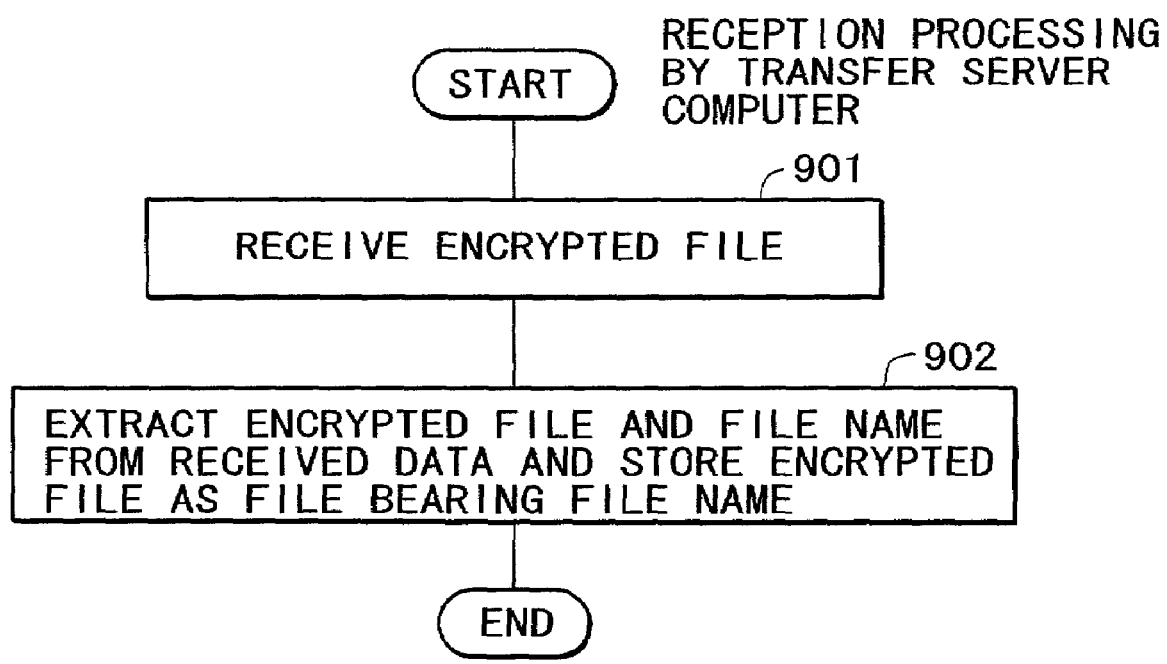
FIG. 12 is a flowchart representing reception processing carried out by a server computer.

The flowchart shown in FIG. 12 begins with a step 901 at which the communication control unit 611 executed in the transfer server computer 605 receives the encrypted file from the server computer 602.

Then, at the next step 902, the communication control unit 611 extracts the file name and the encrypted file from the received data, calling the input/output control unit 612 to store the extracted encrypted file in a storage unit of the transfer server computer 605 as a file 650 identified by the extracted file name. The storage unit itself is shown in none of the figures. As is obvious from the explanation given so far, the extracted file name is the name of the file 150. Thus, the file 650 is stored in the storage unit of the transfer server computer 605 as a counterpart file 650 of the file 150.

After the encrypted file transmitted by the server computer 602 is stored in the transfer server computer 605, the user of the mobile apparatus 603 transmits a request transfer message from the client computer 604 to the transfer server computer 605.

Figure 14:
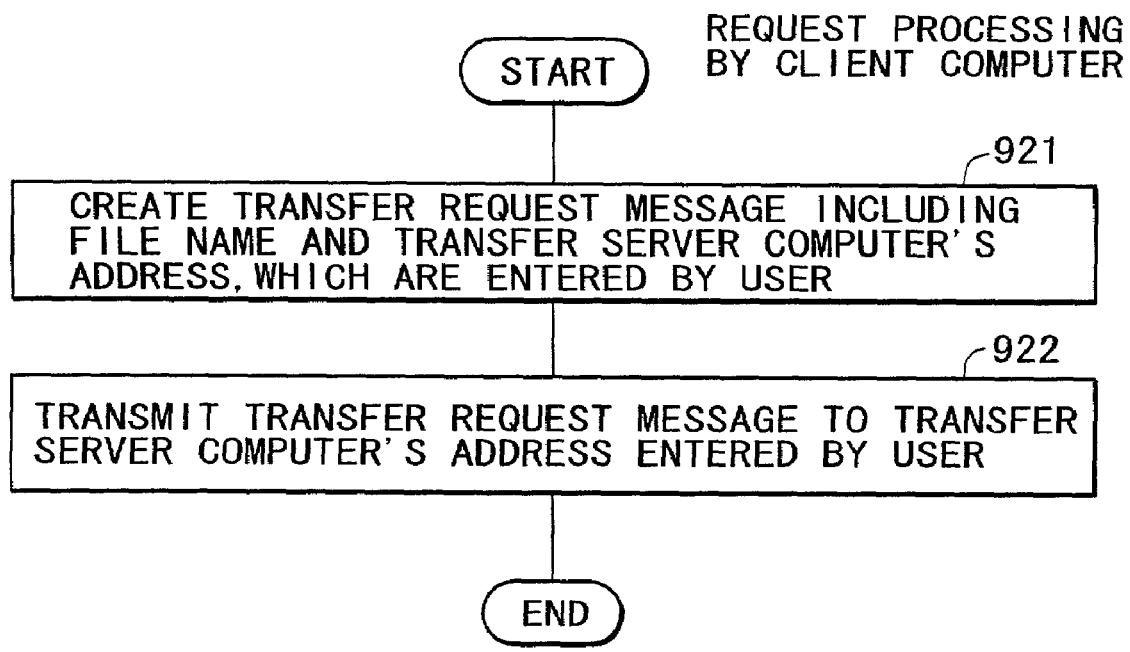
FIG. 14 is a flowchart representing request processing carried out by a client computer.
Figure 15:
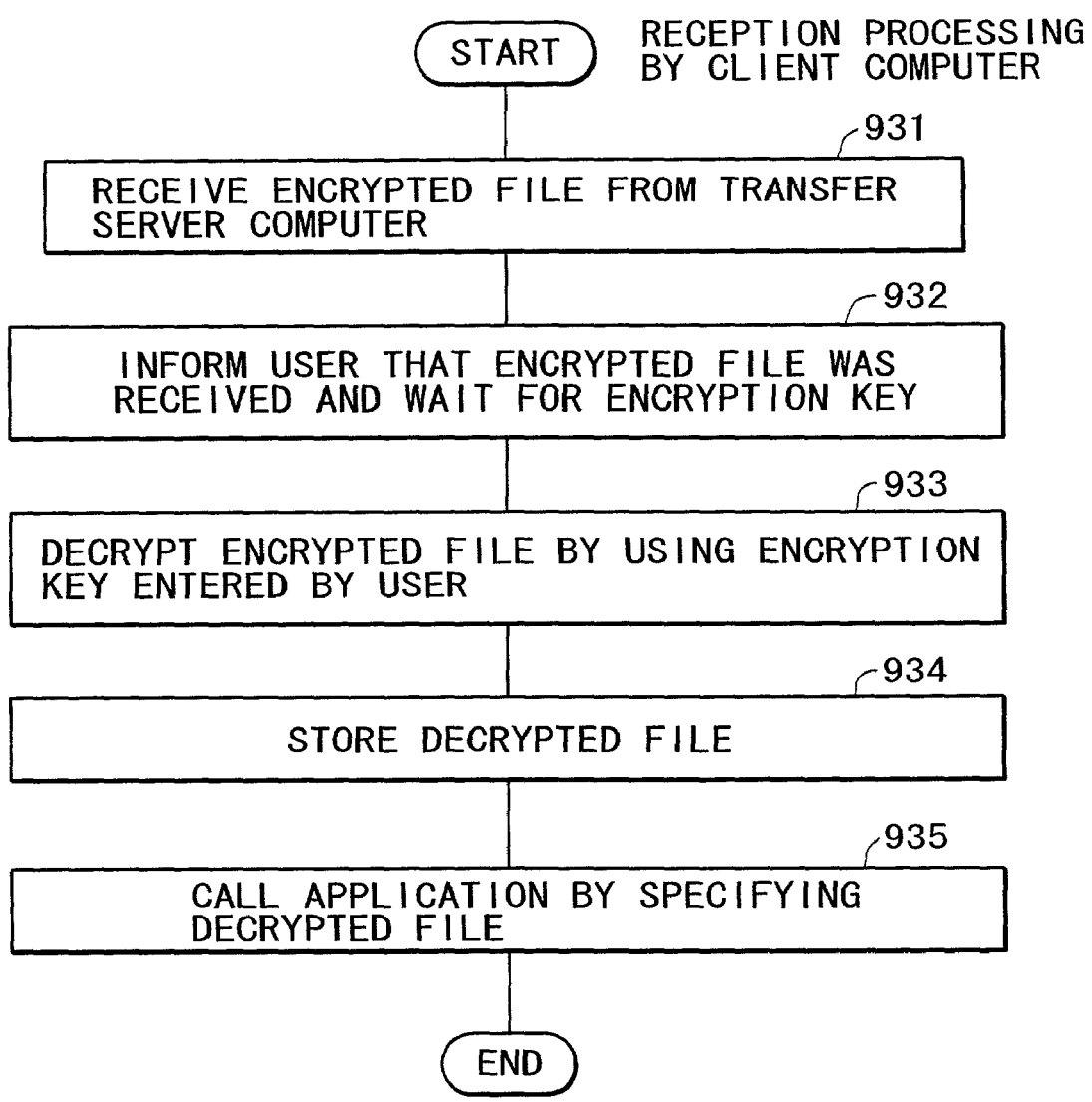
FIG. 15 is a flowchart representing reception processing carried out by a client computer.

The client computer 604 carries out transfer request processing represented by a flowchart shown in FIG. 14 and processing to receive a file transferred from the transfer server computer 605 as indicated by a flowchart shown in FIG. 15.

At a step 921 of the flowchart shown in FIG. 14 to represent the transfer request processing carried out by the client computer 604, the user of the mobile apparatus 603 uses the input/output control unit 122 to enter the address of the transfer server computer 605 and the name of a file 150 to the file receiving unit 623 executed in the client computer 604. The file receiving unit 623 receiving the address of the transfer server computer 605 and the name of a file 150 creates a transfer request message including the file name entered by the user.

Then, at the next step 922, the file receiving unit 623 calls the communication control unit 121 to transmit the transfer request message to the address of the transfer server computer 605 and then enters a state of waiting for a response.

Figure 13:
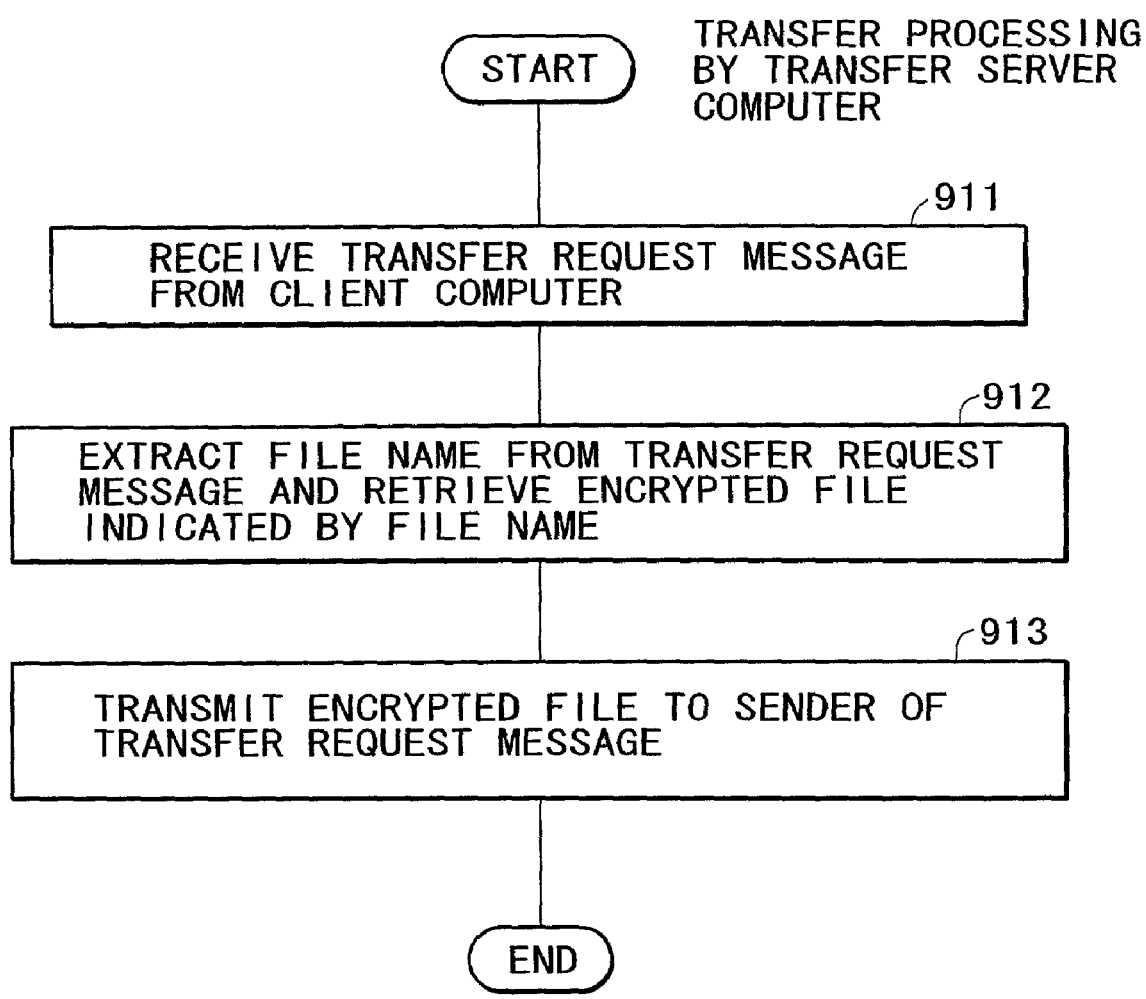
FIG. 13 is a flowchart representing transfer processing carried out by a server computer.

The transfer server computer 605 receiving the transfer request message carries out processing represented by a flowchart shown in FIG. 13.

At a step 911 of the flowchart shown in FIG. 13, the communication control unit 611 of the transfer server computer 605 receives the transfer request message from the client computer 604.

Then, at the next step 912, a file name is extracted from the received transfer request message, and the input/output control unit 612 is called to retrieve a file indicated by the file name. As is obvious from the explanation given so far, the retrieved file is the file 650, that is, a file obtained as a result of encryption of the file 150 stored in the server computer 602.

Subsequently, at the next step 913, the communication control unit 611 transmits the retrieved file 650 to the client computer 604 serving as the originator of the transfer request message in response to the message.

The client computer 604 receiving the file 650 from the transfer server computer 605 carries out the reception processing represented by the flowchart shown in FIG. 15.

The flowchart shown in FIG. 15 begins with a step 931 at which the file receiving unit 623 in the client computer 604 receives the encrypted file from the transfer server computer 605 through the communication control unit 121.

Subsequent steps 932 to 935 are the same as respectively the steps 821 to 824 of the flowchart shown in FIG. 5 for the first embodiment. To be more specific, at the step 932, the client computer 604 informs the user through the output unit 222 that a file has been received and enters a state of waiting for an input to be entered by the user.

When informed through the output unit 222 in the client computer 604 that a file has been received, the user enters the encryption key 405 already revealed to the user through the output unit in the mobile apparatus 603 to the input unit in the client computer 604. Then, the file receiving unit 623 decrypts the received encoded file by using the encryption key 405 at the next step 933.

Then, at the next step 934, the file receiving unit 623 calls the input/output control unit 122 to store the decrypted file as a file 155.

Subsequently, at the next step 935, the file receiving unit 623 calls the application 124 by specifying the file 155. Thus, the user can view the file 155 by using the input and output units in the client computer 604 through execution of the application 124 in the client computer 604.

As described above, the file server unit 610 of the server computer 602 encrypts a file 150 and transmits the encrypted file 150 to the transfer server computer 605. However, the server computer 602 does not have to encrypt the file 150. If the server computer 602 does not encrypt the file 150, the generation of an encryption key by the transmission request creation unit 631 of the mobile apparatus 203, the transmission of the encryption key by the transmission request creation unit 631 to the server computer 602 and the operation carried out by the user to enter the encryption key to the file receiving unit 623 of the client computer 604 can be eliminated. As an alternative, the file 150 can also be encrypted by the communication control unit 611 of the transfer server computer 605.

As described above, in accordance with the fourth embodiment, in order to view a file 150 in the client computer 604, the file receiving unit 123 in the first embodiment is not required. Instead, it is necessary to execute the file receiving unit 623 in the client computer 604. However, the file receiving unit 623 needs to include at least the following processing substance.

A file name entered by the user is received and a transfer request message including the entered file name is created. Then, the transfer request message is transmitted to the transfer server computer 605 and a response from the transfer server computer 605 is waited for. Finally, a file received as a response from the transfer server computer 605 is stored in the storage unit.

Software including functions to carry out the above processing or software capable of carrying out the above processing is widely available under a variety of names ranging from client software to viewing software (or a browser) and stored in the client computer 604 in an executable format in advance in many cases. In this case, the user is capable of viewing the file 150 by using the file receiving unit 623.

In addition, in accordance with the above explanation, the fourth embodiment has the following effects in addition to the effects given by the first embodiment.

That is to say, since a file is transferred from the transfer server computer 605 to the client computer 604, it is impossible to obtain information for making an illegal access to the server computer 602 from the received file even if a malicious program is executed in the client computer 604. It is thus possible to construct a file transfer system having a high security level.

Even though a malicious program is capable of making an illegal access to the transfer server computer 605, the file stored in the transfer server computer 605 has been encrypted by the server computer 602 so that the stored file cannot be utilized illegally as long as the encryption key held in the mobile apparatus 603 is not known. As a result, security can be assured.

In addition, since the file is directly transferred from the transfer server computer 605 to the client computer 604 through the link 634, the network 201 and the link 232, by adopting the wired/fixed communication system, the file can be generally transferred at a high speed but a low cost.

Furthermore, after a transfer request message has been transmitted from the mobile apparatus 603 to the server computer 602, by using any client computer 604 installed at any location, a desired file 150 can be received at a desired time. Thus, the desired file 150 can be utilized without any time and location restrictions. As a result, convenience of the file transfer system can be further improved.

Figure 16:
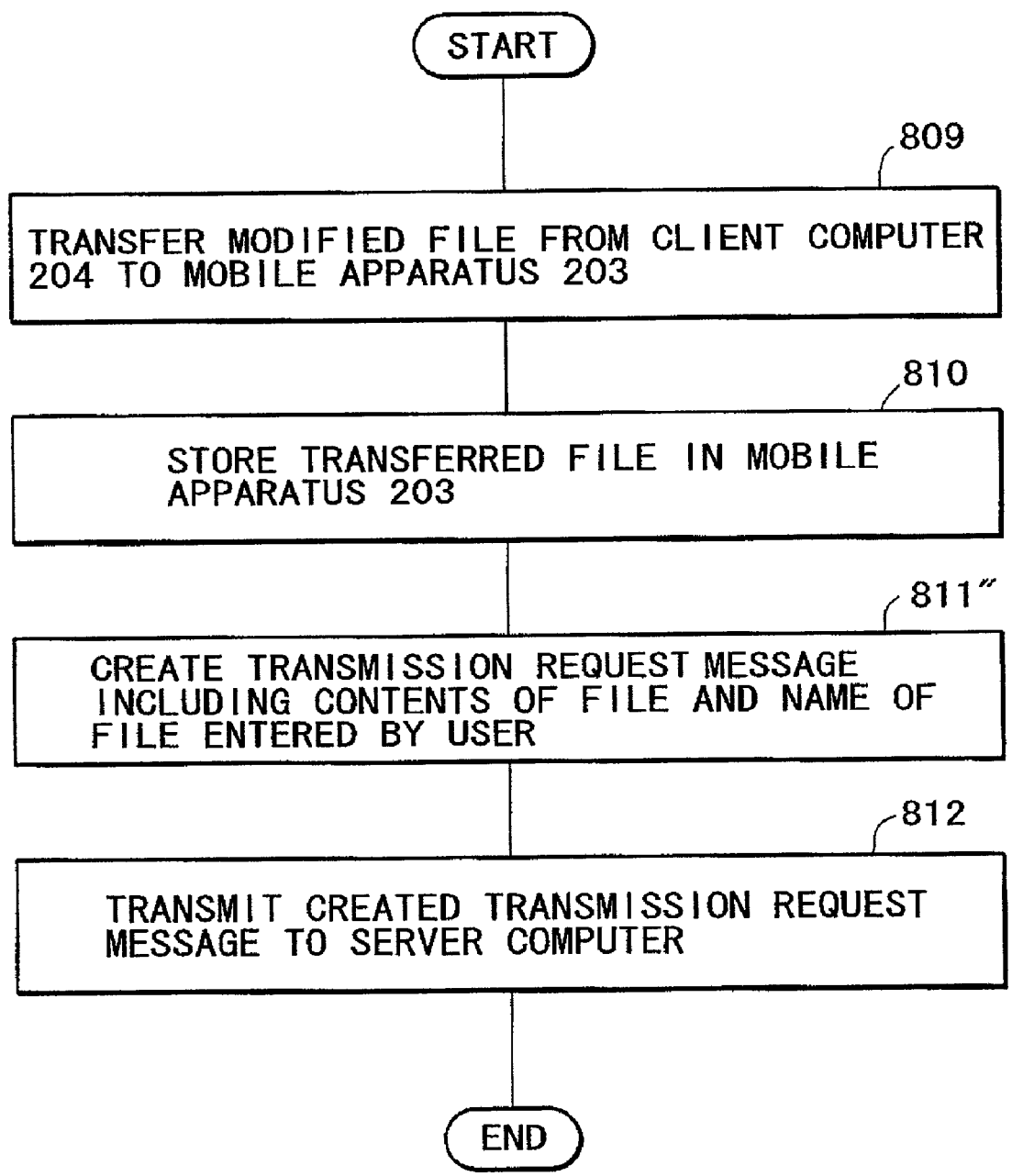
FIG. 16 is a flowchart representing processing carried out by a client computer and a mobile apparatus in a fifth embodiment.

FIG. 16 is a flowchart representing additional processing of a fifth embodiment, which has the same configuration as the first embodiment shown in FIG. 1. In this additional processing, after a file 155 is viewed by execution of the application 124 in the client computer 204 as is the case with the first embodiment, if necessary, the function of the application 124 or the function of another application is used to change the contents of the file 155 and then to store back the modified file in the server computer 202.

The flowchart shown in FIG. 16 begins with a step 809 at which the client computer 204 carries out processing to execute the application 124 in the client computer 204 in order to transmit the contents of an edited and changed file 155 to the mobile apparatus 203.

The contents of the edited and changed file 155 can be transferred to the mobile apparatus 203 by way of the network 201. As an alternative, the contents of an edited and changed file 155 can also be transferred to the mobile apparatus 203 by way of a communication means provided especially between the client computer 204 and the mobile apparatus 203. The communication means provided specially between the client computer 204 and the mobile apparatus 203 can be based on the wireless/mobile communication technique or the wired/fixed communication technique.

Then, at the next step 810, the mobile apparatus 203 carries out processing in which the user is allowed to operate the mobile apparatus 203 to store the received file.

Subsequently, at the next steps 811' and 812, a request message containing the name of the stored file and the contents of the file is created and transmitted to the server computer 202.

This request message includes the user authentication information 402, the name of the stored file and the contents of the file, which are part of the first embodiment's transmission request message 401 shown in FIG. 2.

This request message can be automatically created and transmitted by the transmission request creation unit 131 or by execution of another program in accordance with operations carried out by the user.

Receiving the request message from the mobile apparatus 203, much like the first embodiment, the server computer 202 extracts the user authentication information 402 from the request message in order to authenticate the user and then extracts a file as well as the name of the file from the request message before finally storing the file in the storage unit in the server computer 202 as a file bearing the file name.

In this case, the processing to extract the user authentication information 402 from the request message in order to authenticate the user and the processing to extract a file as well as the name of the file from the request message before finally storing the file in the storage unit in the server computer 202 as a file bearing the file name can be carried out by the file server unit 110 and the input/output control unit 112 respectively or by another program.

A file can be transferred from the mobile apparatus 203 to the server computer 202 with any timing and at any location after the file has been transferred from the client computer 204 to the mobile apparatus 203.

In addition, a file can be transferred from the mobile apparatus 203 to the server computer 202 by using a communication means provided separately from the links 231 and 233. The communication means may adopt the wireless/mobile communication technique or the wired/fixed communication technique.

In accordance with the fifth embodiment, the user is allowed not only to view a file stored in the storage unit in the server computer 202 at the client computer 204, but also to change contents of the file by execution the application 124 in the client computer 204 and store back the modified file in the storage unit in the server computer 202.

In addition, since the modified file is transferred to the server computer 202 by a communication between the mobile apparatus 203 and the server computer 202, even if a malicious program is executed in the client computer 204, the program will not be capable of applying a method to make an illegal access to the server computer 202.

Figure 17:
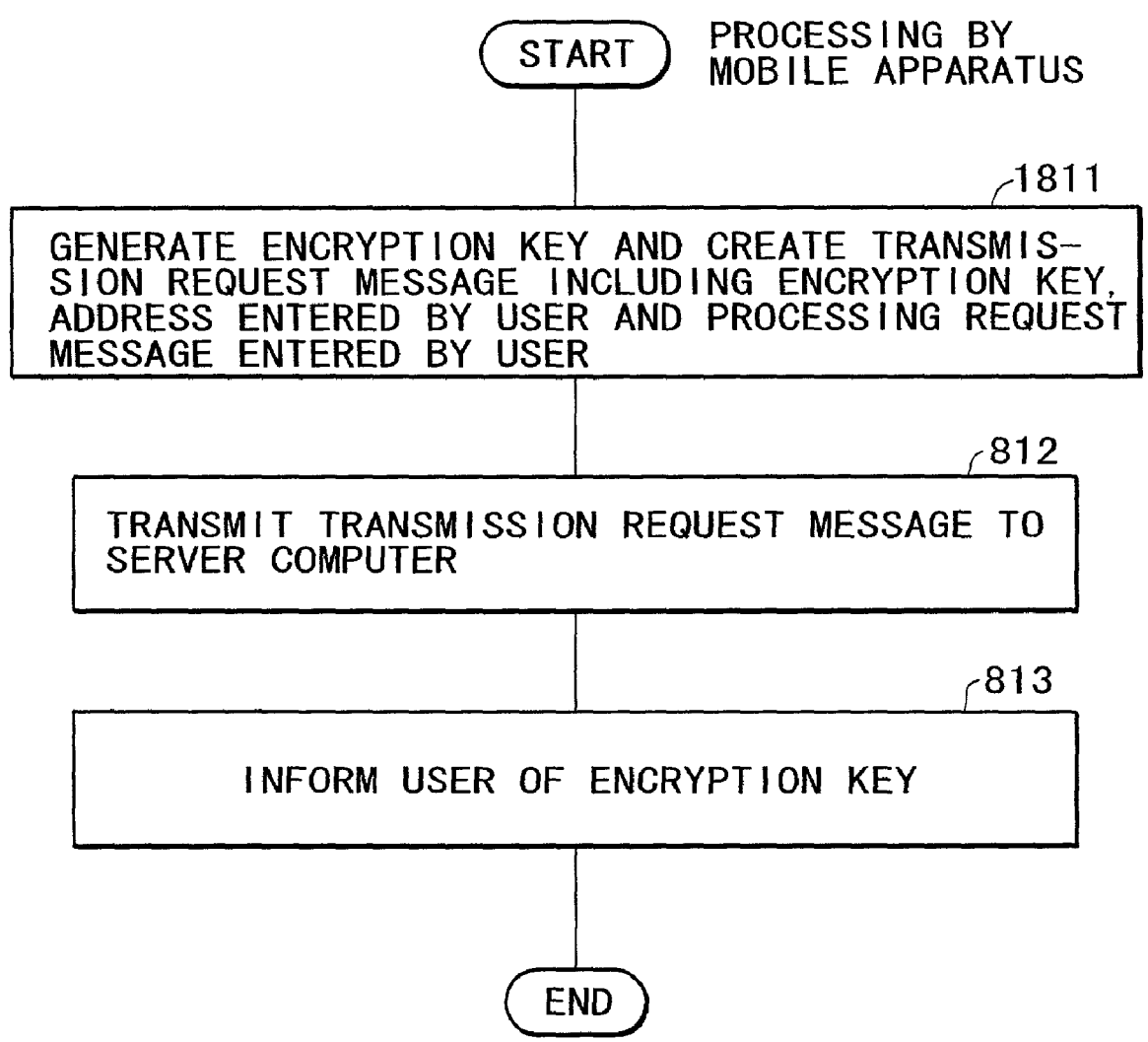
FIG. 17 is a flowchart representing processing carried out by a mobile apparatus in a sixth embodiment.

FIG. 17 is a flowchart representing additional processing of a sixth embodiment, which has the same configuration as the first embodiment shown in FIG. 1. In this additional processing, the user carrying the mobile apparatus 203 is allowed not only to view and change the contents of a file stored in the server computer 202, but also to carry out general processing between a client and a server. To be more specific, the user is allowed to transmit a request from the mobile apparatus 203 to the server computer 202, the server computer 202 is capable of carrying out processing in accordance with the received request, creating a response message and transmitting the response message to the client computer 204 whereas the client computer 204 receiving the response message is capable of displaying the response message to the user on the output unit in the client computer 204.

The flowchart shown in FIG. 17 begins with a step 1811 at which the mobile apparatus 203 carries out processing. In this processing, the user enters a processing request message for the server computer 202 and the address of the client computer 204. The transmission request creation unit 131 of the mobile apparatus 203 creates a transmission request message, which includes the processing request message, an address, an encryption key and user authentication information. The address, the encryption key, and the user authentication information are identical with those of the first embodiment. Thus, this transmission request message is the same as the first embodiment's transmission request message shown in FIG. 2 except that the file name 404 shown in FIG. 2 is replaced by the processing request message.

Then, at the next steps 812 and 813, the same processing as the first embodiment's processing shown in FIG. 3 is carried out. That is to say, the communication control unit 132 transmits the transmission request message to the server computer 202 and the encryption key 405 is revealed to the user through the output unit 212 in the mobile apparatus 203.

In the server computer 202 receiving this transmission request message, the file server unit 110 extracts the processing request message from the transmission request message and carries out processing in accordance with the processing request message. Then, the file server unit 110 creates a response message from results of execution.

The processing according to the processing request message can be carried out by calling an external program by passing on the processing request message to the external program and entering a state of waiting for the external program to return the results of execution. Then, the response message is created from the results of execution.

Subsequently, the file server unit 110 extracts the encryption key from the transmission request message and encrypts the response message by using the encryption key.

Finally, the file server unit 110 extracts the address of the client computer 204 from the transmission request message and calls the communication control unit 111 to transmit the encrypted response message to the address.

That is to say, in place of the first embodiment's file shown in FIG. 4, the server computer 202 transmits a response message processed in the server computer 202 to the client computer 204.

In the client computer 204 receiving the encrypted response message from the server computer 202, the encryption key is input through the input unit 221, the file receiving unit 123 decrypts the encrypted response message by using the encryption key and stores the decrypted response file as a file 155 in the client computer 204 as well as displays the decrypted response file to the user much like the steps 821 to 823 of the first embodiment's flowchart shown in FIG. 5.

In accordance with the sixth embodiment, the user is allowed not only to view and change the contents of a file stored in the server computer 202 at the client computer 204, but also to carry out general processing between a client and a server wherein the user is allowed to transmit a request from the mobile apparatus 203 to the server computer 202, the server computer 202 is capable of carrying out processing in accordance with the received request, creating a response message and transmitting the response message to the client computer 204 whereas the client computer 204 receiving the response message is capable of displaying the response message to the user on the output unit in the client computer 204.

Figure 18:
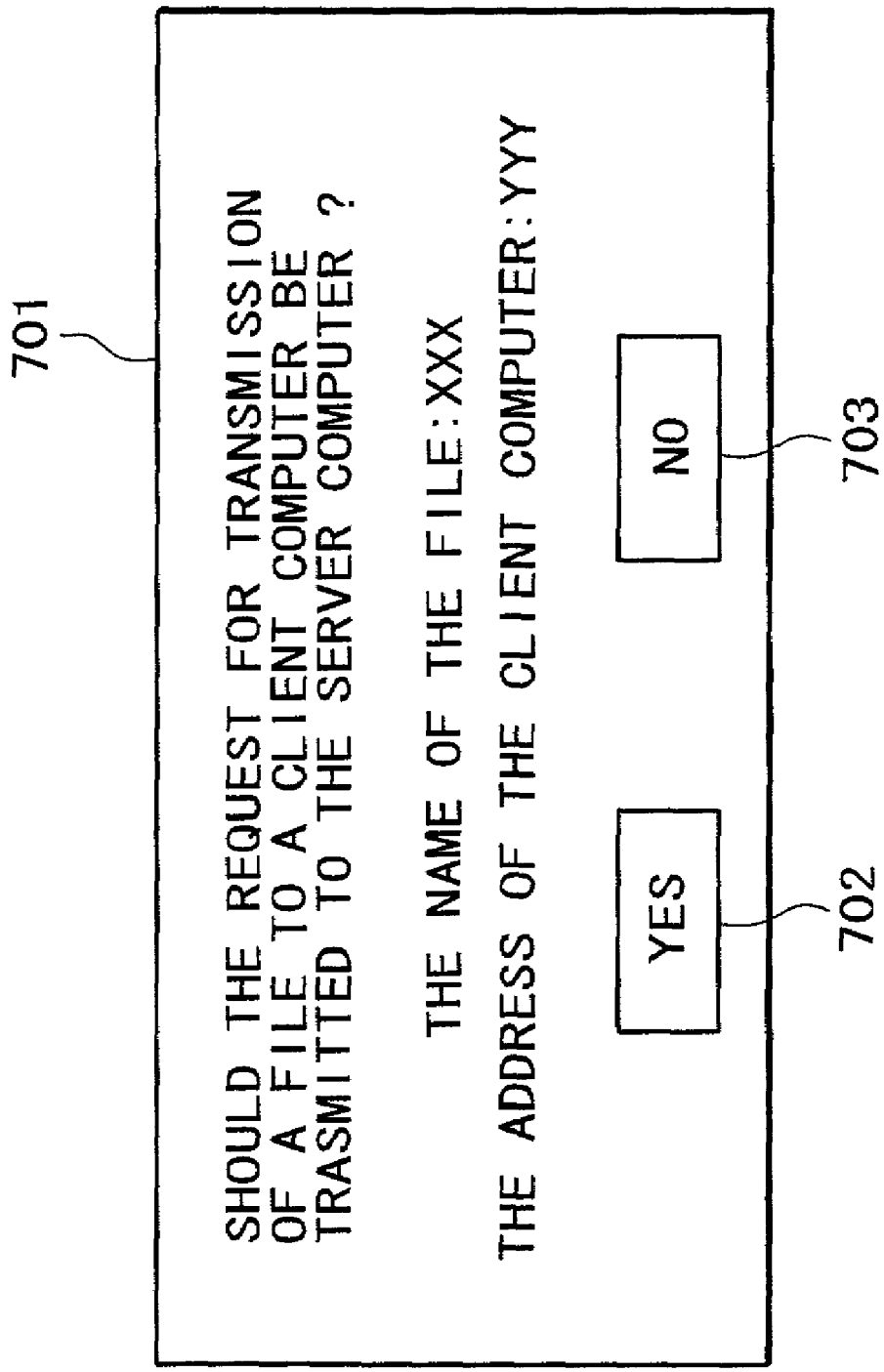
FIG. 18 shows a confirmation screen displayed on an output unit in a mobile apparatus in a seventh embodiment.

FIG. 18 is a diagram showing typical creation of a transmission request message to be transmitted from the client computer 204 making a request for transmission of a file in a seventh embodiment, which has the same configuration as the first embodiment shown in FIG. 1.

The user carrying the mobile apparatus 203 is allowed to enter a request for transmission of a file by not only using the mobile apparatus 203 but by also the input unit 211 in the client computer 204. The request for transmission of file is then transmitted from the client computer 204 to the mobile apparatus 203 so as to eventually allow the file stored in the server computer 202 to be used.

First, in the configuration shown in FIG. 1, the user of the mobile apparatus 203 operates the input unit 221 in the client computer 204 to enter the name of a file to the file receiving unit 123.

The user can enter the name of a file to the file receiving unit 123 by entering the file name to the application 124 and then having the application 124 pass on the file name to the file receiving unit 123.

Receiving the file name, the file receiving unit 123 acquires the address of the client computer 204 and transmits a message to the mobile apparatus 203. The message includes the file name and the address.

Since the file receiving unit 123 is a program executed in the client computer 204, it is easy for the file receiving unit 123 to acquire the address of the client computer 204.

The file receiving unit 123 can transmit the message to the mobile apparatus 203 by way of the link 232, the network 201, and the link 231 by specifying the address of the mobile apparatus 203 or transmit the message through another link provided between the mobile apparatus 203 and the client computer 204.

The message transmitted to the mobile apparatus 203 is received by the communication control unit 132 of the mobile apparatus 203 and passed on to the transmission request creation unit 131. The message may also include information peculiar to the client computer 204 in addition to the address. An example of the information peculiar to the client computer 204 is a list of application programs that can be executed in the client computer 204.

Thus, the transmission request creation unit 131 of the mobile apparatus 203 does not create a transmission request message including the name of a file and an address, which are entered by the user. Instead, when the message transmitted by the client computer 204 to the mobile apparatus 203 is received, the transmission request creation unit 131 executes the following procedure.

First, the transmission request creation unit 131 fetches the name of a file from the message and uses the output unit 212 in the mobile apparatus 203 to show the user a query as to whether or not a transmission request message is to be created and transmitted to the server computer 202 along with a message requesting the user to enter a confirmation response. The output unit 212 then enters a state of waiting for the user to enter a confirmation response via the input unit 211 in the mobile apparatus 203.

More concretely, a typical query as to whether or not a transmission request message is to be created and transmitted to the server computer 202 and a typical message requesting the user to enter a confirmation response are shown in FIG. 18 for an output unit 212 of the mobile apparatus 203 implemented by a liquid-crystal display unit.

In the typical query shown in FIG. 18, notation XXX denotes the name of a file and notation YYY denotes the address of the client computer 204. A button 702 or 703 is selected by the user to enter a confirmation response to the query. If the output unit 212 in the mobile apparatus 203 has another type, another query and another message can be displayed as long as the query and the message have the same contents as those shown in FIG. 18.

After looking at the query and the message requesting the user to enter a confirmation response to the query as shown in FIG. 18, the user determines whether a file indicated by the file name is to be transmitted to the address. If a file indicated by the file name is to be transmitted to the address, the user selects the button 702 to show the confirmation to transmit the file to the transmission request creation unit 131 through the input unit 211 in the mobile apparatus 203.

Assume for example that the input unit 211 is a pen input device. In this case, if the message requesting the user to enter a confirmation response to the query is displayed on the liquid-crystal display unit in the form shown in FIG. 18, the user presses the button 702 by using a pen.

Receiving the confirmation response entered by the user, the transmission request creation unit 131 of the mobile apparatus 203 interprets the contents of the response. If the confirmation response indicates that a file indicated by the file name is to be transmitted to the address, a transmission request message based on the file name and the address is transmitted to the server computer 202 in the same way as the first embodiment.

The rest of the procedure or processing is the same as the first embodiment. That is, based on this transmission request message, the server computer 202 transmits an encrypted file to the client computer 204, which then decrypts the file by using an encryption key entered by the user so that the user can use the decrypted file by using the client computer 204.

In accordance with the seventh embodiment, the user can enter a file transfer request by operating the large input unit of the client computer 204 instead of operating the mobile apparatus 203. Thus, the name of a file can be entered with ease. In addition, it is not necessary for the user to search for the address of the client computer 204 to be entered to the client computer 204. Thus, the operation on the client computer 204 can be carried out with ease.

In addition, before the transmission request message is transmitted to the server computer 202, the mobile apparatus 203 displays a query as to whether a file is to be transmitted to the user who is supposed to enter a confirmation response to the query. Thus, even though a malicious program is executed in the client computer 204, it is impossible to steal a file other than the file 150 from the storage unit in the server computer 202. Furthermore, since the file 150 is transmitted from the server computer 202 to the client computer 204 by way of the link 233, the network 201, and the link 232 generally by adoption of the wired/fixed communication technology, the transmission of the file 150 can be implemented at a high speed and a low cost. Moreover, the transmitted file 150 can be viewed comfortably by using the input and output units in the client computer 204.

Figure 19:
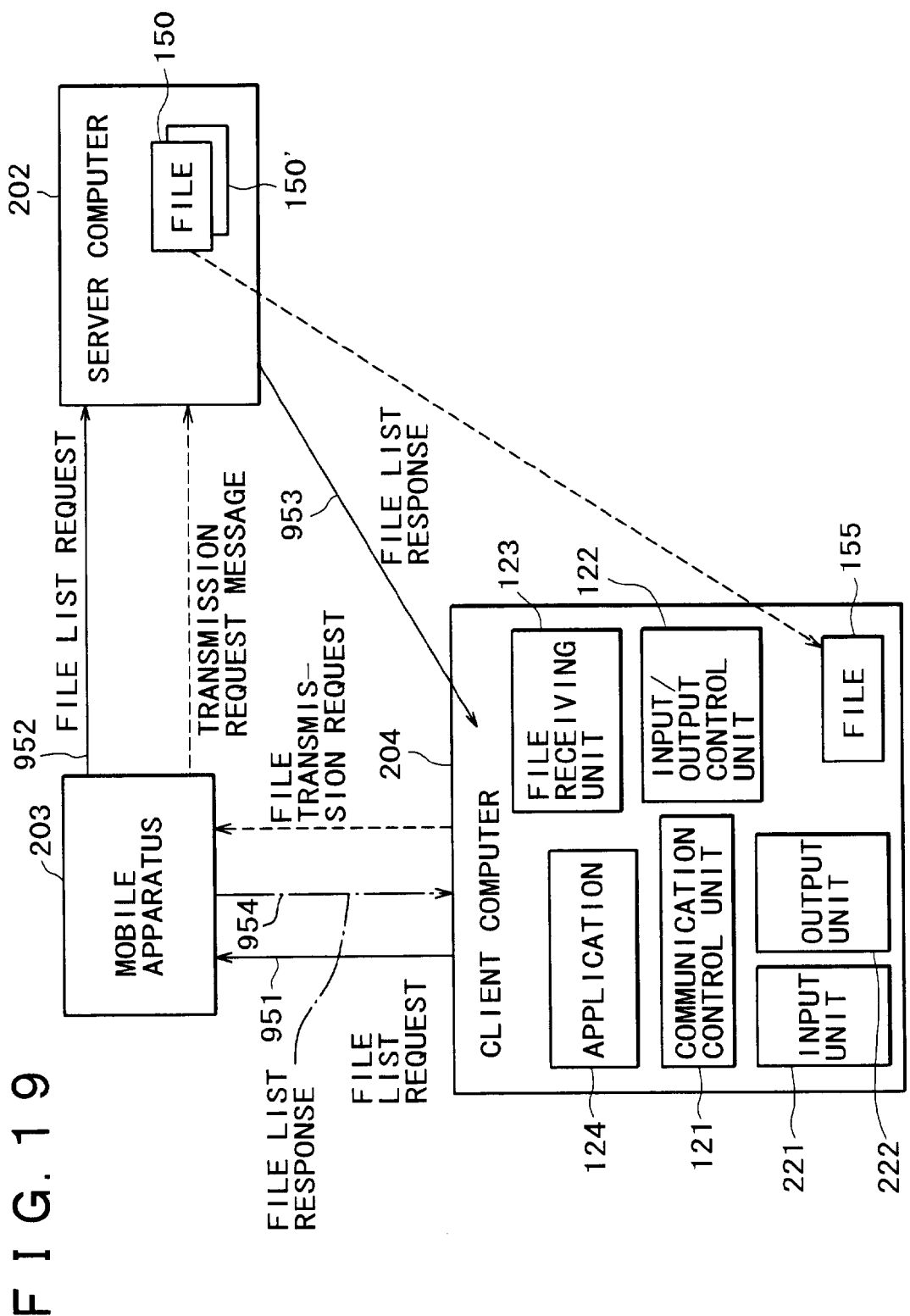
FIG. 19 is a conceptual diagram showing data and request flows among a mobile apparatus, a server computer and a client computer in an eighth embodiment.

FIG. 19 is a block diagram showing the configuration of an eighth embodiment similar to the seventh embodiment except that, prior to transmission of a file request message, a list of file names is acquired by using the client computer 204 and a file selected from the list is then requested through the mobile apparatus 203.

In FIG. 19, dotted lines each represent a flow of processing carried out by the seventh embodiment whereas solid lines each represent a flow of additional processing carried out by the eighth embodiment.

The user selects a desired file to be transferred from a file name list displayed on the output unit 222 in the client computer 204 by entering the name of the desired file via the input unit 221 in the client computer 204.

More concretely, the communication control unit 121 in the client computer 204 as shown in FIG. 1 has a function for making accesses also to one or more other computers' files other than those stored in the storage unit in the client computer 204 itself through the network 201 or another network whereas the other computers each include a mobile apparatus 203.

This function is generally called a distributed file system function. More concretely, when the communication control unit 121 in the client computer 204 receives a request for an access to a specific file from the application 124 or another application, first, the communication control unit 121 determines whether the file indicated by a file name included in the request is a file stored in the storage unit in the client computer 204 itself. If the file indicated by a file name is not a file stored in its own storage unit, another program is called. The program issues a request for an access to the file indicated by the file name to a computer, in which the file is stored, through the network 201 or another network and enters a state of waiting for a result of the access to be transmitted by the other computer in response to the request.

Thus, the application 124 is capable of utilizing a file stored in another computer in the same say as is the file were stored in the storage unit in the client computer 204.

A request for access to a file includes a request for a list of files. In addition, while the other program in this embodiment is the file receiving unit 123 of the client computer 204, the other program can be a program other than the file receiving unit 123.

The eighth embodiment carries out the following processing before performing the processing of the seventh embodiment.

First, a command to read in a file is given to the application 124 of the client computer 204 shown in FIG. 1 by using the input unit 221.

Receiving the command, the application 124 requests the communication control unit 121 to return a list of file names.

Receiving the request, the communication control unit 121 requests the file receiving unit 123 to return a list of file names so that the list can be provided to the application 124.

Receiving the request, the file receiving unit 123 transmits a message requesting that a list of file names be returned to the mobile apparatus 203 by way of the network 201 or another network as indicated by an arrow 951 in FIG. 9.

This request message is received by the communication control unit 132 of the mobile apparatus 203 and passed on to the transmission request creation unit 131.

Receiving the request message, the transmission request creation unit 131 requests the server computer 202 to make a list of file names representing one or all of a plurality of files 150 and 150' stored in the storage unit in the server computer 202 as indicated by an arrow 952 in FIG. 19.

The transmission request creation unit 131 of the mobile apparatus 203 calls the communication control unit 132 to transmit the list of file names to the client computer 204 as a response message as indicated by an arrow 953 in FIG. 19.

The list of file names can be stored in the mobile apparatus 203 in advance or created by the mobile apparatus 203 on the basis of communications with the server computer 202. In either case, the list of file names is transmitted from the mobile apparatus 203 to the client computer 204 as indicated by an arrow 954 shown in FIG. 9.

Receiving the response message from the mobile apparatus 203, the file receiving unit 123 of the client computer 204 extracts the list of file names and supplies the list to the communication control unit 121. The communication control unit 121 passes on the list of file names received from the file receiving unit 123 to the application 124.

The application 124 reveals the contents of the list received from the communication control unit 121 to the user by using the output unit 222 in the client computer 204.

The user selects a desired file from the list of file names and enters the name of the desired file by operating the input unit 221.

The application 124 inputting the file name calls the communication control unit 121, requesting the communication control unit 121 to retrieve the file indicated by the file name. The communication control unit 121 passes on the request to retrieve the file indicated by the file name to the file receiving unit 123.

Then, the file indicated by the file name is transmitted from the server computer 202 to the client computer 204 to be used by the application 124 in the client computer 204 in the same operations as the seventh embodiment.

In accordance with this eighth embodiment, the application 124 displays a list of files 150, 150', and so on stored in the storage unit in the server computer 202 on the output unit to the user, and the user is allowed to select a desired file among those on the list. The selected file can then be used by the user with ease.

The function of the eighth embodiment can be combined with the function of any embodiment described earlier to provide their effects.

In particular, if the function of the eighth embodiment is combined with the function of the first embodiment, the user is allowed not only to select a desired file from a list of files 150, 150' and so on, which are stored in the storage unit of the server computer 202, transfer the selected file to the client computer 204 and execute the application 124 in the client computer 204 to use the file, but also to select desired files from lists of files stored in the storage units of the server computer 202 and other computers, transfer the selected files to the client computer 204 and execute the application 124 in the client computer 204 to use the files.

(A) First Typical Application

In practical use, the embodiments explained so far can be applied to the following typical application, which is referred to as a first typical application.

In the first typical application, the user is an employee of a corporation or a person related to the corporation. The server computer 202 shown in FIG. 1 is a computer installed at a computer center of the corporation. The files 150 and 150' are each a file used by the user in doing jobs and include internal texts of the corporations.

The mobile apparatus 203 is a mobile apparatus given by the corporation to the user. The mobile apparatus 203 is capable of carrying out processing of each embodiment in conjunction with the server computer 202. For this reason, the user always carries the mobile apparatus 203.

The client computer 204 is a computer installed at a public restaurant normally called an Internet cafe. The client computer 204 is open to general users for free or for only paying users. The client computer 204 is connected to the network 201 and capable of carrying out processing of each embodiment in conjunction with the server computer 202.

By operating the mobile apparatus 203 carried by the user in processing of any one of the embodiments described above, the user at the Internet café is capable of transferring one or more files 150 and 150' to the client computer 204 installed at the Internet café and using them.

Since the user does not need to enter information such as a password required for authentication of the user to the client computer 204, it is not necessary to worry about an illegal access to the server computer 202.

In addition, if such Internet cafes are available at a variety of locations, the user can use a client computer installed at any of the Internet cafes to comfortably utilize a file stored in the server computer 202 by being not restricted by the location of the user.

Furthermore, if such an Internet café advertises the activities of rendering services to lend the client computer 204 capable of carrying out processing of each of the embodiments to customers, customers like the user carrying a mobile apparatus equivalent to the mobile apparatus 203 will visit the Internet cafe more frequently and, as a result, the sales will increase.

Moreover, if a use fee is collected from a customer for the service, the sales will further increase.

The function of the Internet café described above is applicable even to a hotel, which also renders the service of an Internet café. In the case of a hotel also rendering the service of an Internet café, a computer equivalent to the client computer 204 is installed in each room. A customer staying at the hotel can use the client computer 204 for free or by paying a fee.

(B) Second Typical Application

In practical use, the embodiments explained so far can be applied to another typical application, which is referred to as a second typical application explained as follows.

In the second typical application, the user can receive services by connecting the user's own computer to the network 201 shown in FIG. 1 from a specific enterprise for free or by paying a fee. A common example of the specific enterprise is an Internet service provider.

The server computer 202 is a computer installed at a computer center of the enterprise whereas the files 150, 150', and so on are files to be used personally by the user.

A service rendered by the enterprise for customers is a service of storing the files on behalf of the user for free or by charging a storage fee to the user. The user carries the mobile apparatus 203 for carrying out processing of any of the embodiments described above in conjunction with the server computer 202.

The client computer 204 is a computer, which is installed at any location and can be used by the user for free or at a usage fee. Connected to the network 201, the client computer 204 is capable of carrying out processing of any of the embodiments described above in conjunction with the server computer 202.

In processing of any ones of the embodiments described above, the user operates the mobile apparatus 203 carried by the user itself at any place to transfer one or more of the files 150, 150', and so on to the client computer 204 installed at the place in order to use the files in the client computer 204.

Since the user does not need to enter information such as a password required for authentication of the user to the client computer 204, the user does not have to worry about illegal accesses to the server computer 202 from the client computer 204. By having the server computers 204 installed at many different locations, the user can comfortably use a file stored in the server computer 202 loaded into any the server computers 204 by being not restricted by the location of the user.

In addition, if an enterprise installs a server computer 202 capable of carrying out processing of any embodiments described above and advertises a service to store personal files of the customer in the server computer 202 on behalf of the customer, a large number of customers who carry a computer equivalent to the mobile apparatus 203 as the user does will select the enterprise as a specific service provider for the customers. As a result, the sales of the enterprise can be increased. Moreover, if a use fee is collected from a customer for the service, the sales will further increase. Furthermore, the enterprise does not have to worry about trouble caused by an illegal access to the server computer 202 even if the client computer 204 installed at any location is used by the user.

An enterprise rendering a service of connecting the computer owned by the customer to the network 201 may be different from an enterprise rendering a service of storing personal files of the customer.

(C) Third Typical Application

In practical use, the embodiments explained so far or their modified versions can be applied to a further typical application, which is referred to as a third typical application explained as follows.

In the third typical application, the server computer 202 is a computer installed at a computer center of a specific enterprise. For the customer, the enterprise renders a service of storing picture data of a photograph of the customer's face along with the name of the customer and other information as files 150, 150', and so on after verifying that the picture data, the name and the other information are indeed the picture data, the name and information of the customer. The service can be rendered for free or by charging a storage fee to the customer.

The user receiving the service is allowed to carry out processing of the embodiments described above between the mobile apparatus 203 carried by the user itself and the server computer 202.

The client computer 204 is a terminal installed typically at a teller counter of a bank. The terminal is used by a teller serving as an operator.

Connected to the network 201, the client computer 204 is capable of carrying out the processing of any embodiment described above in conjunction with the server computer 202 in accordance with a contract or an agreement made with the enterprise.

Thus, the user is capable of proving itself to the operator by using the mobile apparatus 203 carried by the user itself through the processing of any embodiment described above.

More concretely, in front of the teller counter, the user requests that the picture data and the name be transferred from the server computer 202 to the client computer 204, which is placed at the teller counter and used by the operator, by using the mobile apparatus 203 carried by the user itself.

The operator outputs the picture data transferred to the client computer 204 along with the name to the output unit 222 and compares the picture with the face of the user appearing at the teller counter in order to verify that the user appearing at the counter is the true person having the mentioned name matching the transferred name. Thus, it is not necessary to resort to information, which may have been falsified as is the case with an identification card carried by the user.

In addition, the user does not need to carry a document such as an identification card in order to prove itself. Furthermore, in order to have the picture data and the name transferred from the server computer 202 to the client computer 204, the user does not have to give information such as a password required for authentication of the user to the operator using the client computer 204. Thus, there is not any fear of an illegal access to the server computer 202 made by using the information.

As described above, a specific enterprise has the server computer 202 installed with functions provided by the embodiments described above. Moreover, to the customer, the specific enterprise renders a service of assuring another enterprise that the customer is the true person. By collecting a service fee from the customer desiring assurance or from the other enterprise desiring to verify the identification of a customer appearing at a counter, the specific enterprise is capable of raising its sales. In this case, the other enterprise is the owner of the client computer 204. Furthermore, even if the user operates the client computer 204 installed at any location, there is not any fear of trouble caused by an illegal access made to the server computer 202.

In addition, the specific enterprise may collect a fee of using the server computer 202 from the operator or the owner of the client computer 204. Thus, the specific enterprise is capable of raising its sales.

In a transmission of the picture data and the name to the client computer 204, the operator of the client computer 204 is capable of verifying that the source transmitting the picture data and the name is the server computer 202 belonging to the enterprise. Furthermore, if the source transmitting the picture data and the name is the server computer 202 of a trusted enterprise, the operator is capable of having the customers identification proved with a higher degree of security. When receiving any data through a network, the recipient is capable of verifying the sender of the data by adoption a widely known method called a digital signature technique, which can be easily applied to the processing of the embodiments described above.

As described above, in accordance with the embodiments of the present invention, the user of a mobile apparatus can comfortably use a file stored in a server computer by operating an efficient output unit such as a large display unit of a client computer installable at any location and operating the client computer's efficient input unit including a large keyboard and a mouse.

In addition, in accordance with the embodiments of the present invention, even if the user utilizes the server computer's file in the client file as described above, there is not any fear of illegal accesses to the client computer, which include an illegal intrusion and rejection of a service requested by the authorized user.

Furthermore, in accordance with the embodiments of the present invention, the user can have a file transmitted from the server computer to the client computer at a high speed and a low cost.

Moreover, in accordance with the embodiments of the present invention, the user can carry out operations for authentication of the user on the mobile apparatus carried by the user itself by being not restricted by the installation place an the type of the client computer. Thus, the user is capable of doing the operations with ease, In addition, in accordance with the embodiments of the present invention, even if the user incorrectly enters the address of the client computer and/or the name of a file, an unauthorized user can be prevented from inadvertently making an access to an unintended file.

Furthermore, in accordance with the embodiments of the present invention, the user can request a plurality of files stored in a plurality of computers in a distributed manner to be transferred to a client computer in a batch operation and use the files.

Moreover, in accordance with the embodiments of the present invention, the user can transfer a program for receiving a file from the server computer from the mobile apparatus to a client computer, which does not include the program, and use the file after installing the program in the client computer.

In addition, in accordance with the embodiments of the present invention, the user can not only view a file stored in the server computer but also correct the file and store the corrected file back into the server computer.

Furthermore, in accordance with the embodiments of the present invention, the user can have client-server processing carried out in the server computer and view results of the processing in the client computer.

Moreover, in accordance with the embodiments of the present invention, the user can select a file to be transferred from the server computer in the client computer.

In addition, in accordance with the embodiments of the present invention, an enterprise is capable of rendering a customer service of renting a client computer to a customer and transferring a file of the customer from the server computer to the client computer to be used by the customer in a comfortable manner in the client computer without the customer's fear of an illegal access to the server computer so that, through such a service, the ability to gather customers can be increased and, by collecting fees to rent client computers, sales of the enterprise can be raised.

Furthermore, in accordance with the embodiments of the present invention, by installing a server computer, an enterprise allows a customer to store files of the customer in the server computer and the enterprise is capable of rendering a customer service of transferring any files of the customer from the server computer to a client computer to be used by the customer in a comfortable manner in the client computer without the customer's fear of an illegal access to the server computer so that, through such a service, the ability to attract customers can be increased and, by collecting fees to rent client computers, sales of the enterprise can be raised.

Moreover, in accordance with the embodiments of the present invention, the user can prove itself to the operator of a client computer without the need for the user to carry identification or the like.

In addition, in accordance with the embodiments of the present invention, an enterprise is capable of authenticating a user without resorting to an identification, which is carried by the user but may be a falsified identification.

Furthermore, in accordance with the embodiments of the present invention, a server computer installed by a specific enterprise allows another enterprise to render a service of authenticating a customer without resorting to an identification carried by the customer and, by collecting fees from the customer, the other enterprise or both the customer and the other enterprise, the sales of the specific enterprise can be increased.

Collection of fees and its accounting process can be carried out by a means for charging a fee of using the server computer 202 (the second computer) to the user of the mobile apparatus 203 (the third computer) as well as a means for paying the fee of using the server computer 202 to the owner of the sever computer 202, and these means can be implemented in the server computer 202 or the client computer 204 (the first computer).

As an alternative, the collection of fees and its accounting process can be carried out by a means for charging a fee of using the server key 202 (the second computer) to the owner of the client computer 204 (the first computer) and a means for paying the fee of using the server computer 202 to the owner of the sever computer 202.

In addition, in order to authenticate an individual, there is provided an information processing system or a file transferring system for allowing the user of a mobile apparatus (the third computer) to prove itself to the operator (the person in charge) of the client computer (the first computer), wherein the user's picture data and personal data are stored as files in the server computer (the second computer) and the user can use a transfer command of the mobile apparatus to transfer the user's picture data and personal data from the server computer to the client computer to be used for proving the user to the operator (the person in charge) of the client computer.

The embodiments described above are typical and not to be considered as limitations imposed on the present invention in all respects. The scope of the present invention is not defined by the above description but by the ranges of claims and should thus be interpreted to include all changes that can be made to the embodiments as far as the changes are within ranges of meanings and contents, which are equivalent to the ranges of the claims.

What is claimed is:

1. A file transfer system for transferring a file stored in a second computer to a first computer through a network in response to a request made by a third computer to transfer the file and in dependence on a result of authentication of the third computer, the first computer being allowed to be used by anyone besides a user of the third computer, the file transfer system comprising:

a fourth computer, which is connected to the network, having a function of receiving the file transmitted from the second computer in response to a request made by the second computer, and a function of transmitting the file to the first computer in response to a request made by the first computer, wherein:

the third computer, which is portable and connectable to the network, has a transmission requesting means for selectively designating a file among files stored in the second computer and requesting the second computer that the third computer be authenticated and the file be transmitted from the second computer to the first computer;

the second computer has a means for finding the file requested by the third computer and a means for transmitting the file to a fourth computer after authenticating the third computer;

the first computer has a means for requesting the fourth computer that the file received from the second computer be transferred to the first computer; and the fourth computer has a means for transmitting the file to the first computer in response to a request received from the first computer.

2. A file transfer system according to claim 1 wherein:

the transmission means for transmitting the file from the second computer to the fourth computer has an encryption means for encrypting the file prior to transmission of the file; and the first computer has a decryption means for decrypting the file received from the second computer.

* * * * *